United States Patent
Kuroyanagi et al.

[11] Patent Number: 5,805,320
[45] Date of Patent: Sep. 8, 1998

[54] CROSS-CONNECT DEVICE

[75] Inventors: Satoshi Kuroyanagi; Kazuo Hironishi; Takuji Maeda, all of Kawasaki, Japan

[73] Assignee: Fujitsu Limited, Kanagawa, Japan

[21] Appl. No.: 658,739

[22] Filed: Jun. 5, 1996

[30] Foreign Application Priority Data

Jul. 5, 1995 [JP] Japan .................................. 7-169536
Dec. 14, 1995 [JP] Japan .................................. 7-325415

[51] Int. Cl.$^6$ ..................................................... H04J 14/02
[52] U.S. Cl. ............................ 359/117; 359/128; 359/161
[58] Field of Search ..................................... 359/128, 117, 359/110, 161, 139; 370/217–220, 225, 228

[56] References Cited

U.S. PATENT DOCUMENTS

| | | | |
|---|---|---|---|
| 4,701,904 | 10/1987 | Darcie | 359/119 |
| 5,069,521 | 12/1991 | Hardwick | 359/110 |
| 5,179,548 | 1/1993 | Sandesara | 370/16.1 |
| 5,323,144 | 6/1994 | Imai et al. | 370/228 |
| 5,408,462 | 4/1995 | Opczynski | 370/220 |
| 5,442,623 | 8/1995 | Wu | 370/118 |
| 5,457,556 | 10/1995 | Shiragaki | 359/117 |
| 5,471,332 | 11/1995 | Shiragaki et al. | 359/117 |
| 5,625,478 | 4/1997 | Doerr et al. | 359/119 |

FOREIGN PATENT DOCUMENTS 9105426   4/1991   European Pat. Off. ............... 359/139

*Primary Examiner*—Leslie Pascal
*Attorney, Agent, or Firm*—Helfgott & Karas, P.C.

[57] ABSTRACT

An optical cross-connect device for optical networks is connected to reserve optical transmission lines and working optical transmission lines, and is used to switch optical signals. The optical cross-connect device includes a bypass component, a routing component and connection links. The bypass component includes an optical-space switch that is connected to the reserve optical transmission lines. The routing component also includes an optical-space switch that is connected to the working optical transmission lines. The connection links are connected between both input and output parts of the optical-space switch of both the bypass component and the routing component.

9 Claims, 28 Drawing Sheets

|  | OPTICAL FILTERS | WAVELENGTH CONVERTERS | OPTICAL SWITCHES (2×2) |
|---|---|---|---|
| CONVENTIONAL TECHNIQUE | $nk_1+mk_2+ik_3$ | $nk_1+mk_2+ik_3$ | $(nk_1+mk_2+ik_3)^2$ |
| PRESENT INVENTION — ROUTING COMPONENT | $nk_1+ik_3+jk_4$ | $nk_1+ik_3+jk_4$ | $(nk_1+ik_3+jk_4)^2$ |
| PRESENT INVENTION — BYPASS COMPONENT TYPE A | — | — | $(k_2+k_4)^2$ |
| PRESENT INVENTION — BYPASS COMPONENT TYPE B | $mk_2+jk_4$ |  | $m(k_2+k_4)^2$ |
| PRESENT INVENTION — BYPASS COMPONENT TYPE C | $mk_2+jk_4$ | $mk_2+jk_4$ | $(mk_2+jk_4)^2$ |

(B)

|  | OPTICAL FILTERS | WAVELENGTH CONVERTERS | OPTICAL SWITCHES (2×2) |
|---|---|---|---|
| CONVENTIONAL TECHNIQUE | 36 | 36 | 1296 |
| PRESENT INVENTION — ROUTING COMPONENT | 24 | 24 | 576 |
| PRESENT INVENTION — BYPASS COMPONENT TYPE A | — | — | 25 |
| PRESENT INVENTION — BYPASS COMPONENT TYPE B | 20 | — | 100 |
| PRESENT INVENTION — BYPASS COMPONENT TYPE C | 20 | 20 | 400 | n=4, m=4, i=4, j=4    k1=4, k2=4, k3=1, k4=1

(C)

|  | OPTICAL FILTERS | WAVELENGTH CONVERTERS | OPTICAL SWITCHES (2×2) |
|---|---|---|---|
| CONVENTIONAL TECHNIQUE | 144 | 144 | 20736 |
| PRESENT INVENTION — ROUTING COMPONENT | 96 | 96 | 9216 |
| PRESENT INVENTION — BYPASS COMPONENT TYPE A | — | — | 100 |
| PRESENT INVENTION — BYPASS COMPONENT TYPE B | 80 |  | 800 |
| PRESENT INVENTION — BYPASS COMPONENT TYPE C | 80 | 80 | 6400 | n=8, m=8, i=8, j=8    k1=8, k2=8, k3=2, k4=2

| | | | OPTICAL FILTERS | WAVELENGTH CONVERTERS | OPTICAL SWITCHES (2×2) |
|---|---|---|---|---|---|
| CONVENTIONAL TECHNIQUE | | WP | $n(k_1+k_2+k_3)$ | — | $n(k_1+k_2+k_3)^2$ |
| | | VWP | $n(k_1+k_2+k_3)$ | $n(k_1+k_2+k_3)$ | $n^2(k_1+k_2+k_3)^2$ |
| PRESENT INVENTION | ROUTING COMPONENT | WP | $n(k_1+k_3+k_4)$ | — | $n(k_1+k_3+k_4)^2$ |
| | | VWP | $n(k_1+k_3+k_4)$ | $n(k_1+k_3+k_4)$ | $n^2(k_1+k_3+k_4)^2$ |
| | BYPASS COMPONENT | TYPE A | — | — | $2k_2(k_4+k_5)$ |
| | | TYPE B | $n(k_2+k_4+k_5)$ | — | $2nk_2(k_4+k_5)$ |
| | | TYPE C | $n(k_2+k_4+k_5)$ | $n(k_2+k_4+k_5)$ | $2n^2k_2(k_4+k_5)$ |

(B)

| | | | OPTICAL FILTERS | WAVELENGTH CONVERTERS | OPTICAL SWITCHES (2×2) |
|---|---|---|---|---|---|
| CONVENTIONAL TECHNIQUE | | WP | 40 | — | 400 |
| | | VWP | 40 | 40 | 1600 |
| PRESENT INVENTION | ROUTING COMPONENT | WP | 28 | — | 196 |
| | | VWP | 28 | 28 | 784 |
| | BYPASS COMPONENT | TYPE A | — | — | 16 |
| | | TYPE B | 24 | — | 64 |
| | | TYPE C | 24 | 24 | 256 | n=4, k1=4, k2=4, k3=2, k4=1, k5=1

(C)

| | | | OPTICAL FILTERS | WAVELENGTH CONVERTERS | OPTICAL SWITCHES (2×2) |
|---|---|---|---|---|---|
| CONVENTIONAL TECHNIQUE | | WP | 80 | — | 1600 |
| | | VWP | 80 | 80 | 6400 |
| PRESENT INVENTION | ROUTING COMPONENT | WP | 56 | — | 784 |
| | | VWP | 56 | 56 | 3136 |
| | BYPASS COMPONENT | TYPE A | — | — | 64 |
| | | TYPE B | 48 | — | 256 |
| | | TYPE C | 48 | 48 | 1024 | n=4, k1=8, k2=8, k3=4, k4=2, k5=2

| | | OPTICAL FILTERS | WAVELENGTH CONVERTERS | OPTICAL SWITCHES (2×2) |
|---|---|---|---|---|
| CONVENTIONAL TECHNIQUE | WP | 160 | — | 3200 |
| | VWP | 160 | 160 | 25600 |
| PRESENT INVENTION / ROUTING COMPONENT | WP | 112 | — | 1568 |
| | VWP | 112 | 112 | 12544 |
| PRESENT INVENTION / BYPASS COMPONENT | TYPE A | — | — | 64 |
| | TYPE B | 96 | — | 512 |
| | TYPE C | 96 | 96 | 4096 | n=8, k1=8, k2=8, k3=4, k4=2, k5=2

(E)

| | | OPTICAL FILTERS | WAVELENGTH CONVERTERS | OPTICAL SWITCHES (2×2) |
|---|---|---|---|---|
| CONVENTIONAL TECHNIQUE | WP | 320 | — | 12800 |
| | VWP | 320 | 320 | 102400 |
| PRESENT INVENTION / ROUTING COMPONENT | WP | 224 | — | 6272 |
| | VWP | 224 | 224 | 50176 |
| PRESENT INVENTION / BYPASS COMPONENT | TYPE A | — | — | 256 |
| | TYPE B | 192 | — | 2048 |
| | TYPE C | 192 | 192 | 16384 | n=8, k1=16, k2=16, k3=8, k4=4, k5=4

CROSS-CONNECT DEVICE

BACKGROUND OF THE INVENTION

1. Field of the Invention

The present invention relates to a cross-connect device for a network such as an optical network.

2. Description of the Related Art

Transmitting systems allowing large amounts of data to be rapidly transmitted from one node to another node have been developed in the past. Wavelength multiplexing is carried out in such transmitting systems in order to make transmission systems more economical. Wavelength multiplexing involves the modulation of multiple signals by converting the wavelength for each individual band in the form of a carrier, and their subsequent synthesis for transmission in a single transmission line. However, as multiplexed signals are increased, the effects of link failure, such as when link failure occurs in the transmission line, are greater than in an ordinary transmission line. In such cases, there is a need for a cross-connect function allowing the wavelength multiplexed signal paths to be rapidly switched so to ensure that they are detoured. Devices having a cross-connect function in connecting one node with another are thus referred to as cross-connect devices. Cross-connect devices employed in optical transmission systems using an optical technique are referred to as optical cross-connect devices.

Optical cross-connect devices allow paths to be switched for each wavelength of wavelength multiplexed signals. Path rerouting using reserve optical transmission lines needs to be efficiently carried out in order to economize transmission in optical cross-connect devices.

FIG. 26 is an illustration of an optical network involving the application of an optical technique.

151 is an optical cross-connect device (OXC), 152 is a wavelength multiplex optical transmission line, 153 is an electrical cross-connect device (EXC), 154 is a switching system (SW), and 155 is an electrical signal or optical signal transmission line. The wavelength multiplex optical transmission line 152 comprises a working optical transmission line and a reserve optical transmission line.

The optical cross-connect device 151 splits the wavelength multiplexed optical signals among the wavelength multiplex optical transmission line 152 into wavelengths $\lambda 1$, $\lambda 2$, $\lambda 3$, ... and selects a predetermined outgoing line for the output of each wavelength.

In this case, the optical network can be divided into a WP (wavelength path) network in which the wavelength is not converted and a VWP (virtual wavelength path) network in which the wavelength is converted as needed. In these optical networks, signals including signals passing through the electrical cross-connect device 153 undergo wavelength multiplexing. Optical signals which doroppes to the node are split to the electrical cross-connect device 153 side. The electrical cross-connect device 153 and the switching system 154 execute switching in VP (virtual path) and VC (virtual channel) units.

FIG. 27 illustrates the relationship between a conventional optical cross-connect device and electrical cross-connect device. The symbol k1 indicates multiple working optical transmission lines. The working optical transmission lines k1 transmit wavelength multiplexed optical signals obtained from multiplexing of wavelengths $\lambda 1$ to $\lambda n$. The symbol k2 indicates multiple reserve optical transmission lines. The reserve optical transmission lines k2 transmit wavelength multiplexed optical signals obtained from multiplexing of wavelengths $\lambda 1$ to $\lambda m$. The symbol k3 indicates multiple interface links. The interface links k3 transmit wavelength multiplexed optical signals obtained from multiplexing of wavelengths $\lambda 1$ to $\lambda i$ between the optical cross-connect device (OXC) 151 and the electrical cross-connect device (EXC) 153. The optical cross-connect device (OXC) 151 is connected to the working optical transmission lines k1, the reserve optical transmission lines k2, and the interface links k3.

FIG. 28 illustrates a conventional optical cross-connect device in a VWP network.

161 indicates optical couplers that split wavelength multiplexed signals. 162 indicates multiple optical filters that change the wavelength of the optical passing through. The wavelength multiplexed optical signals are separated by the optical couplers 161 and optical filters 162. 163 indicates optical-space switch. 164 indicates wavelength converters in which the wavelength of input optical signals is converted to a desired wavelength. 165 indicates optical couplers which combine optical signals passing through the wavelength converters 164. The optical cross-connect device in the VWP network consists of optical couplers 161, optical filters 162, a optical-space switch 163, wavelength converters 164, and optical couplers 165. The optical cross-connect device in a WP network is a structure in which wavelength converters 164 are deleted.

The wavelength multiplexed optical signals are split to a number of paths by the optical couplers 161 according to the degree of multiplexing. The split wavelength multiplexed optical signals pass through individual optical filters 162 and are thus filtered in the form of signals according to wavelengths $\lambda 1$ to $\lambda n$, $\lambda 1$ to $\lambda m$, and $\lambda 1$ through $\lambda i$. The separated wavelength signals are input to the optical-space switch 163.

The optical-space switch 163 is composed, for example, of a combination of several 2×2 optical switches. In the optical-space switch 163, each switch element is controlled by a control component not shown in the figure. For example, the optical-space switch 163 forms paths indicated by the broken lines. In the VWP network, when the wavelengths of the wavelength multiplexed optical signals on the input and output ports of the optical-space switch 163 are different, the wavelength converters 164 convert them to the output side wavelength, and the wavelength multiplexed optical signals are then transmitted to the wavelength multiplexing optical couplers 165.

When link failure occurs in the optical transmission lines, the optical cross-connect device 151 reroute the tailed link to a normal link. In this case, the topical cross-connect device 151 transmits wavelength multiplexed optical signals using the empty parts of the reserve optical transmission lines k2. The rerouting allows the wavelength multiplexed optical signals to be transmitted continuously between the nodes of the optical network, thereby enhancing the reliability of the optical network.

For example, in FIG. 28, when link failure occurs in the output working optical transmission lines k1, the optical-space switch 163 is controlled to reroute the optical signals to a normal link. That is, wavelength multiplexed optical signals from the input working optical transmission lines k1 and input interface links k3 are transmitted to the output reserve optical transmission lines k2.

In this case, the rerouting to the reserve optical transmission lines k2 must be accomplished without blocking. Large numbers of expensive optical-space switches 163 are needed, however, to accomplish nonblocking switch in conventional structure. Conventional techniques thus suffer from economical problems.

SUMMARY OF THE INVENTION

An object of the present invention is to provide an economical cross-connect device which can provide efficient path rerouting and reduce the number of expensive optical-space switches.

A cross-connect device, which is connected to working transmission lines and reserve transmission lines, and which is used to switch signals from the input transmission lines to the output transmission lines, comprising:

a bypass component, which is connected to the reserve transmission lines and is used to switch the signals from the input reserve transmission lines and first links to the output reserve transmission lines and second links; and a routing component, which is connected to the working transmission lines and is used to switch the signals from the input working transmission lines and the second links to the output working transmission lines and the first links.

An optical cross-connect device, which is connected to reserve optical transmission lines and working optical transmission lines, and which is used to switch wavelength multiplexed optical signals, comprising:

a bypass component, which is connected to the reserve optical transmission lines and includes at least a optical-space switch;

a routing component, which is connected to the working optical transmission lines and includes at least an optical-space switch; and connection links that are connected between the bypass component and the routing component.

An optical cross-connect device, wherein said routing component is connected to the working optical transmission line, and the connection links, and is used to route signals contained in the wavelength multiplexed optical signals.

An optical cross-connect device, wherein said routing component comprises:

optical couplers for splitting the wavelength multiplexed optical signals;

optical filters for selecting a preassigned signal from the couplers output signals;

an optical-space switch, which switches output ports for output signals from the optical filters;

wavelength converters for converting the wavelength of output signals from the optical-space switch; and optical couplers in which the output signals from the wavelength converters are multiplexed to produce the wavelength multiplexed optical signals.

An optical cross-connect device, wherein said bypass component is connected between the input and output ports of the reserve optical transmission lines; and said connection links are such that the output port of the bypass component is connected to the input port of the routing component, and the output port of the routing component is connected to the input port of the bypass component.

An optical cross-connect device, wherein said bypass component comprises:

first optical couplers for splitting wavelength multiplexed optical signals;

optical filters for selecting a preassigned signal from the output signals;

an optical-space switch for routing output signals from the optical filters; and optical couplers for producing the wavelength multiplexed signals from the output optical signals from the optical-space switch, wherein the bypass component is connected between the input and output port of the reserve optical transmission lines, and the connection links are such that the output port of the bypass component is connected to the input port of the routing component, and the output port of the routing component is connected to the input port of the bypass component.

An optical cross-connect device, wherein said bypass component comprises:

first optical couplers for splitting wavelength multiplexed optical signals;

optical filters for selecting a preassigned signal from the output signals;

an optical-space switch for routing output signals from the optical filters;

wavelength converters for converting the wavelength of output signals from the optical-space switch; and second optical couplers for producing the wavelength multiplexed optical signals by multiplexing the output optical signals from the wavelength converters, wherein the bypass component is connected between the input and output ports of the reserve optical transmission lines, and the connection links are such that the output port of the bypass component is connected to the input port of the routing component, and the output port of the routing component is connected to the input port of the bypass component.

An optical cross-connect device, wherein said bypass component comprises:

a first optical-space switch connected to the reserve optical transmission lines on the input port;

a second optical-space switch connected to the reserve optical transmission lines on the output port;

bypass links connected between the output port of the first optical-space switch and the input port of the second optical-space switch; and connection links, which are connected between the output port of the first optical-space switch and the input port of the routing component, and between the input port of the second optical-space switch and the output port of the routing component.

An optical cross-connect device, wherein said bypass component comprises:

first optical couplers for splitting wavelength multiplexed optical signals;

first optical filters for selecting a preassigned signal from the output signals;

a first optical-space switch to which optical signals separated by the first optical filters are input;

second optical couplers for combining the output signals from the first optical-space switch for transmission to the bypass links and connection links;

third optical couplers for splitting the wavelength multiplexed optical signals that have been input through the bypass links and the wavelength multiplexed optical signals that have been input through the connection links;

second optical filters for selecting a preassigned signal from the coupler output signals;

a second optical-space switch to which optical signals separated by the second optical filters are input; and fourth optical couplers for combining the output optical signals from the second optical-space switch for transmission to the reserve optical transmission lines.

An optical cross-connect device, wherein said bypass component comprises:

wavelength converters connected to the output side of the first optical-space switch; and wavelength converters connected to the output port of the second optical-space switch.

An optical cross-connect device, wherein said routing component is connected, on the input port, with working optical transmission lines and the connection links to the bypass component, and comprises:

first optical couplers for splitting input wavelength multiplexed optical signals;

optical filters for selecting a preassigned signal from the coupler output signals;

a optical-space switch for switching output ports for the output signals from the first optical filters according to the wavelength;

wavelength converters for converting the wavelengths of output optical signals from the optical-space switch; and second optical couplers for multiplexing the output optical signals from the wavelength converters to produce the wavelength multiplexed optical signals; and said bypass component comprises:

a first optical-space switch connected to the reserve optical transmission lines on the input port;

a second optical-space switch connected to the reserve optical transmission lines on the output port;

bypass links connected between the output port of the first optical-space switch and the input port of the second optical-space switch; and connection links, which are connected between the output port of the first optical-space switch and the input port of the routing component, and between the input port of the second optical-space switch and the output port of the routing component.

In the present invention, the number of first and second links or connection links k4 can be lower than the number of working transmission lines or working optical transmission lines k1. As such, it is possible to construct a cross-connect device or optical cross-connect device with a fewer number of parts than in conventional techniques by separating the routing component and bypass component structures, thus allowing the invention to be more economical.

The number of parts can be made even smaller than in conventional techniques by constructing the bypass component with at least first and second optical-space switches, allowing link failure in the working optical transmission lines k1 to be resolved.

Other objects and advantages of the present invention will become apparent during the following discussion in conjunction with the accompanying drawings, in which:

BRIEF DESCRIPTION OF THE DRAWINGS

FIG. 11 is a comparison of the structures of the first preferred embodiment;

FIG. 24 is a comparison of the structures of the second preferred embodiment;

FIG. 25 is a comparison of the structures of the second preferred embodiment;

DESCRIPTION OF THE PREFERRED EMBODIMENTS

Preferred embodiments of the cross-connect device of the present invention for networks are described below with reference to the drawings.

First Embodiment

Figure 1:
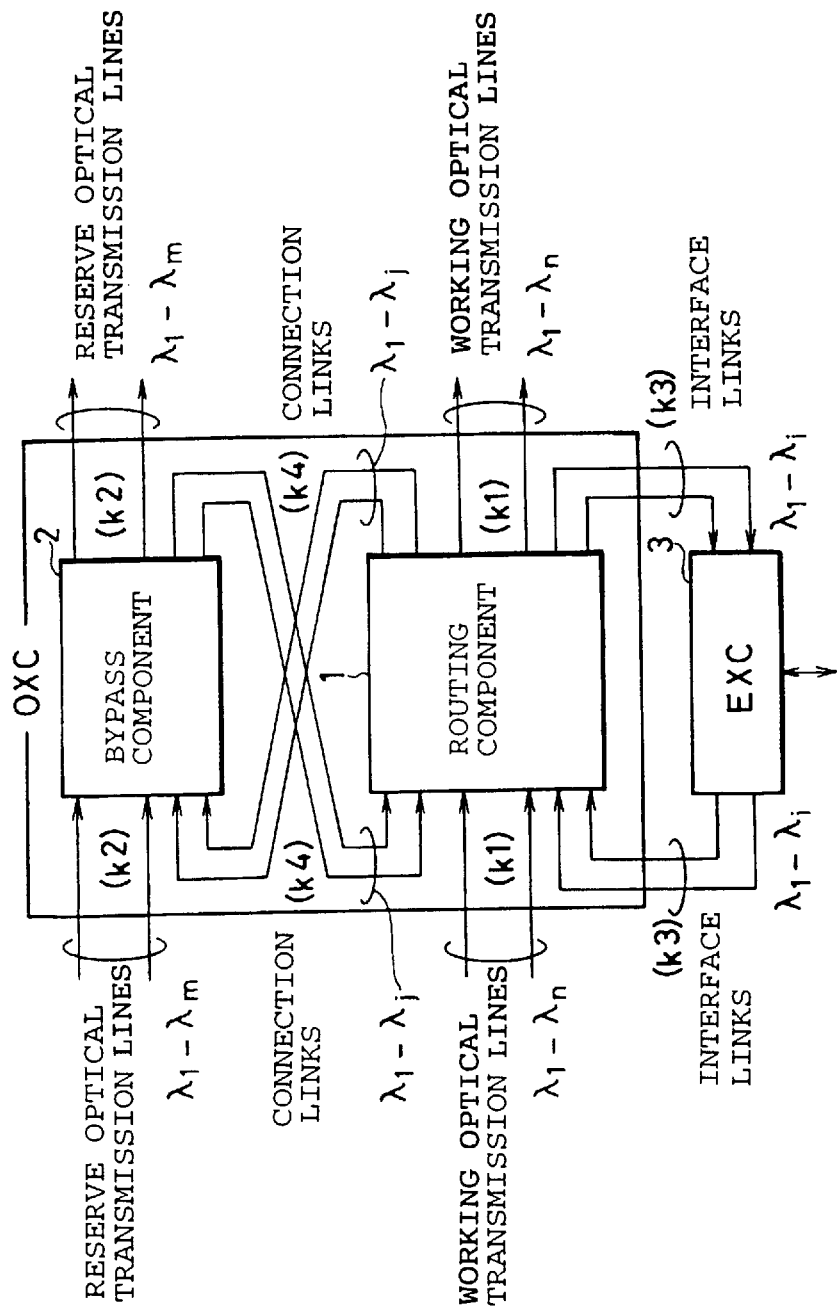
FIG. 1 is an illustration of a first preferred embodiment of the present invention.

FIG. 1 is an illustration of a first preferred embodiment of the present invention. OXC is an optical cross-connect device, 1 is a routing component, 2 is a bypass component, 3 is an electrical cross-connect device (EXC), k1 are working optical transmission lines, k2 are reserve optical transmission lines, k3 are interface links between the optical cross-connect device OXC and the electrical cross-connect device 3, and k4 are connection links connecting the routing component 1 and the bypass component 2.

The working optical transmission lines k1 indicate multiple optical transmission lines for transmitting wavelength multiplexed optical signals having wavelengths λ1 through λn. The reserve optical transmission lines k2 indicate multiple optical transmission lines for transmitting wavelength multiplexed optical signals having wavelengths λ1 through λm. The interface links k3 indicate multiple optical transmission lines for transmitting wavelength multiplexed optical signals having wavelengths λ1 through λi. The connection links k4 indicate multiple optical transmission lines for transmitting wavelength multiplexed optical signals having wavelengths λ1 through λj.

The routing component 1 and bypass component 2 have optical-space switches. The routing component 1 and bypass component 2 are alternately connected by means of the connection links k4. The electrical cross-connect device 3 is connected by a switching system (not shown in the figure) and executes cross-connection in VP nits. The electrical cross-connect device 3 and the optical cross-connect device OXC are connected via interface links k3 that transmit wavelength multiplexed optical signals. The electrical cross-connect device 3 is used to convert wavelength multiplexed optical signals, that have been split by the routing component 1, into electrical signals which are transmitted to a desired witching system. The electrical cross-connect device 3 is used to convert signals from the switching system into wavelength multiplexed optical signals which are transmitted via the interface links k3 to the routing component 1.

The working optical transmission lines k1 are never subject to link failure all at the same time. As such, the number of reserve optical transmission lines k2 can be fewer than the number of working optical transmission lines k1. The number of reserve optical transmission lines k2 can also be the same as the number of working optical transmission lines k1. The number of connection links k4 can also be fewer than the number of working optical transmission lines k1 or reserve optical transmission lines k2. The number of interface links k3 is determined by the volume of the electrical cross-connect device 3.

The bypass component 2 is connected between the input and output ports of the reserve optical transmission lines k2. In the routing component 1, wavelength multiplexed optical signals transmitted from the interface links k3 are routed according to wavelength. Routing by means of wavelength separation allows the routing component 1 to transmit wavelength multiplexed optical signals through the interface links k3 to the electrical cross-connect device 3. The routing component 1 connects the input sides and output sides of the working optical transmission lines k1 and routes the optical signals according to wavelength.

When link failure occurs, for example, in the output working optical transmission lines k1, the routing component 1 switches wavelength multiplexed optical signals, which have been transmitted to the output working optical transmission lines k1, and transmits them through the connection links k4 to the input port of the bypass component 1. The bypass component 2 switches the wavelength multiplexed optical signals, which have been input through the connection links k4, and transmits them to the reserve optical transmission lines k2.

When link failure occurs in the input working optical transmission lines k1, the bypass component 2 transmits wavelength multiplexed optical signals, which have been transmitted from source node through the reserve optical transmission lines k2, through the connection links k4 to the routing component 1. The routing component 1, in the same manner as the wavelength multiplexed signals input through the input working optical transmission lines k1, routes wavelength multiplexed optical signals, which have been input through the connection links k4, according to wavelength and transmits them to the output port of the working optical transmission lines k1, and interface links k3.

The routing component 1 is accordingly connected to the working optical transmission lines k1, interface links k3, and connection links k4. The bypass component 2 is connected to the reserve optical transmission lines k2 and the connection links k4. When link failure occurs in the working optical transmission lines k1, the optical cross-connect switches the working optical transmission lines k1 to the reserve optical transmission lines k2 to transmit the wavelength multiplexed optical signals. In this case, an optical cross-connect device including the routing component 1 and the bypass component 2 is more economical than conventional structures.

The routing component 1 and the bypass component 2 can each serve as the cross-connect device containing an electrical signal-based space switch. The symbol k1 stands for electrical signal-based working transmission lines at this time. The symbol k2 stands for electrical signal-based reserve transmission lines. The symbol k3 stands for electrical signal-based interface links. The symbol k4 stands for first links by which electrical signals from the output port of the routing component 1 are transmitted to the input port of the bypass component 2. The symbol k4 stands for second links by which electrical signals from the output port of the bypass component 2 are transmitted to the input port of the routing component 1.

Figure 2:
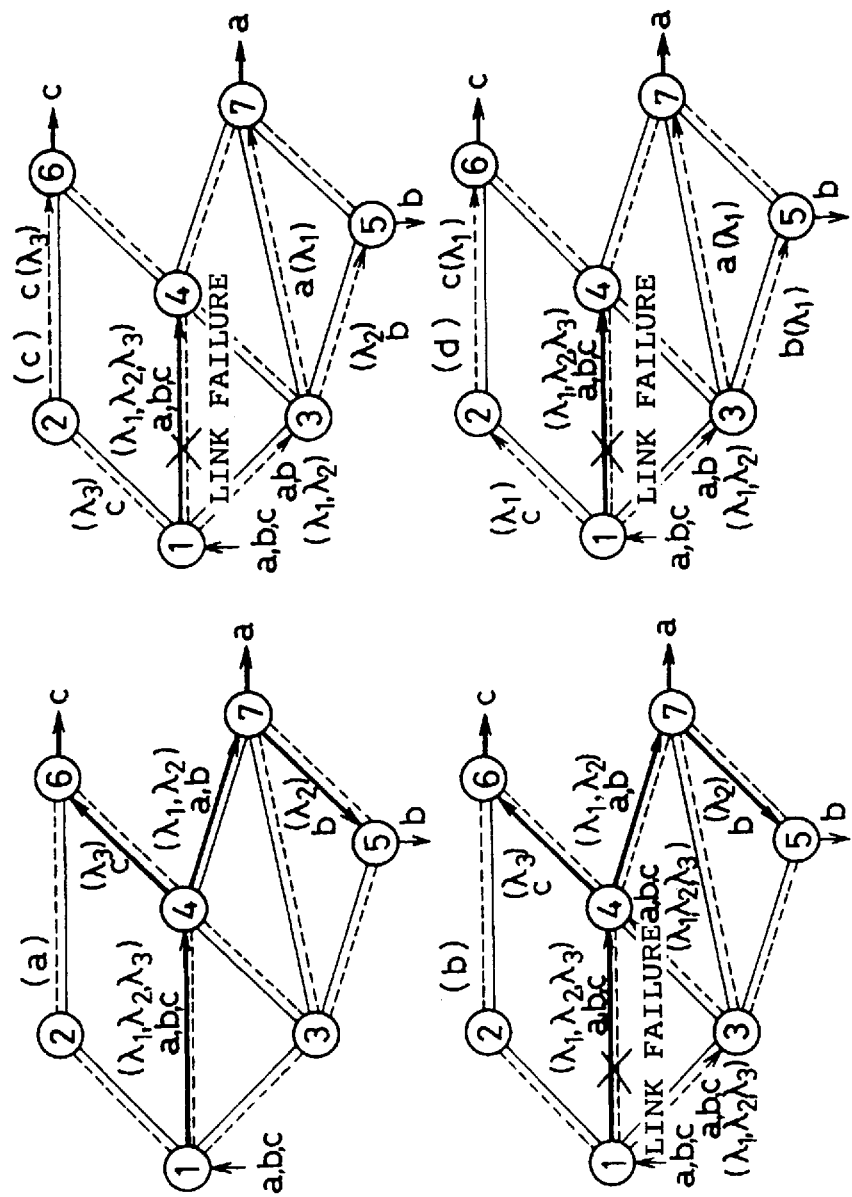
FIG. 2 is an illustration of the path rerouting method.

FIG. 2 is an illustration of a path rerouting method. In the figure, I through VII indicate optical cross-connect devices. FIG. 2(a) is an illustration of a normal state, while FIGS. 2(b) through (d) illustrate cases in which link failure has occurred in the working optical transmission lines between optical cross-connect devices I and IV.

The solid paths connecting the optical cross-connect devices I through VII indicate working optical transmission lines, while the dotted lines indicate reserve optical transmission lines. In FIG. 2, optical signals a, b, and c with wavelengths of λ1, λ2, and λ3 are transmitted from the optical cross-connect device I to the optical cross-connect devices VII, V, and VI, respectively.

FIG. 2(a) is of a normal case in a WP network, or in a VWP network where no wavelengths are converted. Optical signal c with a wavelength λ3, which are transmitted from the optical cross-connect device I through the optical cross-connect device IV to the optical cross-connect device VI by way of the working optical transmission line indicated by the solid line arrow. Optical signals a and b with wavelengths λ1 and λ2, which are transmitted from the optical cross-connect device I through the optical cross-connect device IV to the optical cross-connect device VII by way of the working optical transmission lines indicated by the solid line arrow. Optical signal b with a wavelength of λ2 is also transmitted through the optical cross-connect device VII to the optical cross-connect device V by way of the working optical transmission lines indicated by the solid line arrow.

The present invention allows any of the path rerouting indicated in FIGS. 2(b) through (d). The path rerouting method in FIG. 2(b) is Type A, that in FIG. 2(c) is Type B, and that is FIG. 2(d) is Type C. These are described below.

When link failure occurs between optical cross-connect devices 1 and 4, Type A shown in FIG. 2(b) makes use of the reserve transmission lines passing through the optical cross-connect device 3. That is, the optical cross-connect device I controls the routing component 1 and the bypass component 2 (see FIG. 1) and switches the wavelength multiplexed optical signals, which have been transmitted to the working optical transmission lines where link failure has occurred, and transmits them to the reserve optical transmission lines. The bypass component 2 in the optical cross-connect device III (see FIG. 1) connects reserve optical transmission lines that are connected with the optical cross-connect device I and reserve optical transmission lines that are connected with the optical cross-connect device IV. Accordingly, wavelength multiplexed optical signals a, b, and c with wavelengths $\lambda 1$, $\lambda 2$, and $\lambda 3$ are transmitted along the route indicated by the broken line arrow as a detour by way of optical cross-connect device III.

When link failure occurs between optical cross-connect devices I and IV, Type B shown in FIG. 2(c) makes use of the reserve transmission lines passing through the optical cross-connect device II and the reserve transmission lines passing through the optical cross-connect device III. That is, the optical cross-connect device I transmits optical signals a and b with wavelengths $\lambda 1$ and $\lambda 2$ to the reserve optical transmission lines on the optical cross-connect device III side, and transmits optical signal c with a wavelength $\lambda 3$ to the reserve optical transmission lines on the optical cross-connect device II side, so that the optical cross-connect device III transmits optical signal a with a wavelength $\lambda 1$ to the reserve optical transmission lines on the optical cross-connect device VII side, while the optical cross-connect device III transmits the optical signal b with the wavelength $\lambda 2$ to the reserve optical transmission lines on the optical cross-connect device V side, and the optical cross-connect device II transmits the optical signal c with a wavelength $\lambda 3$ to the reserve optical transmission lines on the optical cross-connect device VI side. The optical signals a, b, and c are thus transmitted, with no change in the wavelengths $\lambda 1$, $\lambda 2$, and $\lambda 3$, through the reserve optical transmission lines to desired node.

When link failure occurs between optical cross-connect devices I and IV, Type C shown in FIG. 2(d) makes use of the reserve optical transmission lines passing through the optical cross-connect device II and the reserve optical transmission lines passing through the optical cross-connect device III. That is, the optical cross-connect device I transmits optical signals a and b with wavelengths $\lambda 1$ and $\lambda 2$ to the reserve optical transmission lines on the optical cross-connect device III side, and transmits optical signal c with a wavelength $\lambda 3$ to the reserve optical transmission lines on the optical cross-connect device II side. At such times, when there is no space for wavelength $\lambda 3$ on reserve optical transmission lines connected to optical cross-connect device II side, the optical cross-connect device I converts optical signal c with a wavelength $\lambda 3$ to a wavelength $\lambda 1$ and transmits it to the reserve optical transmission lines on the optical cross-connect device II side. The optical cross-connect device III transmits optical signal a with a wavelength $\lambda 1$ to the reserve optical transmission lines on the optical cross-connect device VII side, and transmits the optical signal c with the wavelength $\lambda 2$ to the reserve optical transmission lines on the optical cross-connect device V side. At such times, when there is no space for the wavelength $\lambda 2$ on reserve optical transmission lines connected to the optical cross-connect device V side, the optical cross-connect device III converts the optical signal b with a wavelength $\lambda 2$ to wavelength $\lambda 1$ and transmits it to the reserve optical transmission line on the optical cross-connect device V side. Empty wavelengths in the reserve optical transmission lines are thus utilized in the optical cross-connect devices, allowing a detour to be formed.

Figure 3:
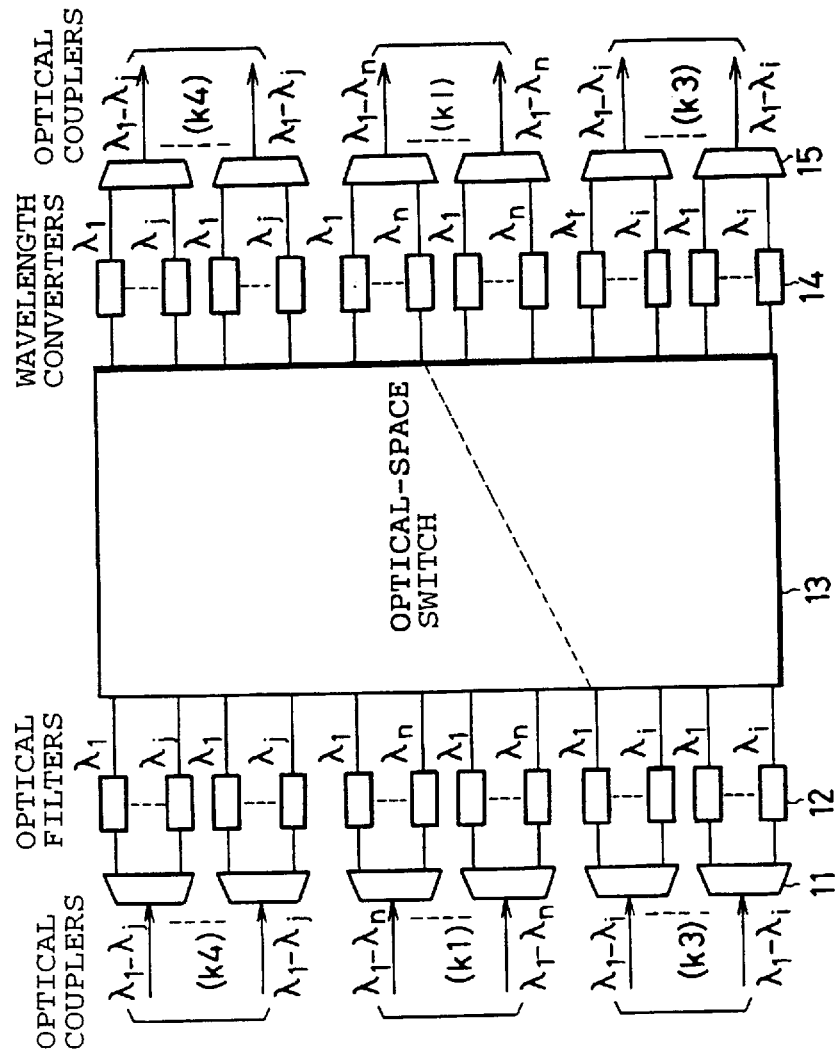
FIG. 3 is an illustration of the routing component.

FIG. 3 is an illustration of a routing component 1. 11 indicates optical couplers for splitting wavelength multiplexed optical signals, 12 indicates optical filters for separating wavelengths, 13 indicates an optical-space switch, 14 indicates wavelength converters, and 15 indicates optical couplers for wavelength multiplexing.

The optical-space switch 13 is composed, for example, of a combination of multiple 2×2 optical switches. The optical-space switch 13 is connected to connection links k4 that transmit wavelength multiplexed optical signals with wavelengths $\lambda 1$ through $\lambda j$, is connected to working optical transmission lines k1 that transmit wavelength multiplexed optical signals with wavelengths $\lambda 1$ through $\lambda n$, and is connected to interface links k3 that transmit wavelength multiplexed optical signals with wavelengths $\lambda 1$ through $\lambda i$, wherein signals are routed according to wavelength.

For example, when the path indicated by the dotted line in the optical-space switch 13 is formed, optical signal with a wavelength $\lambda 1$ in the interface links k3 is splitted by the optical couplers 11. It is then separated from optical signals with other wavelengths by the optical filters 12. They are then transmitted through the optical switch to the wavelength converters 14 in the working optical transmission lines k1 and converted from a wavelength $\lambda 1$ to a wavelength $\lambda n$. They undergo wavelength multiplexing by the optical couplers 15 and are transmitted in the form of wavelength multiplexed optical signals to the working optical transmission lines k1.

Figure 4:
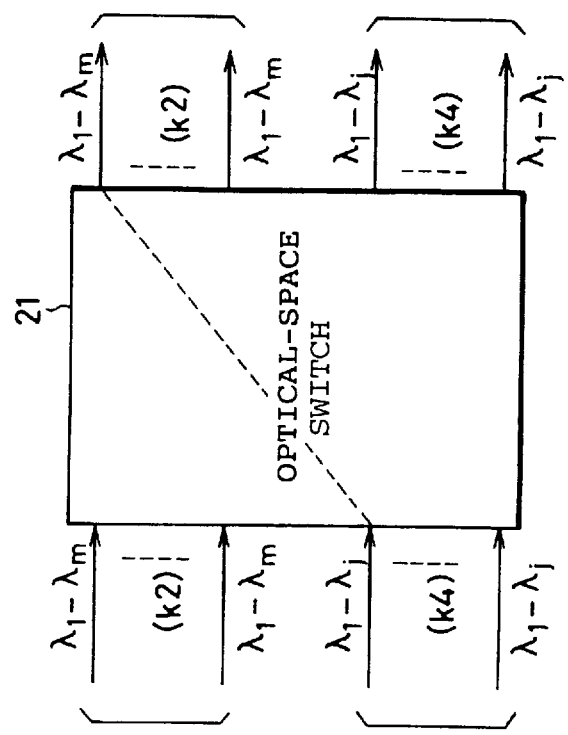
FIG. 4 is an illustration of a bypass component suitable for the Type A path rerouting method.

FIG. 4 is an illustration of a bypass component 2 suitable for the aforementioned Type A path rerouting method. 21 indicates optical space switch. A bypass component 2 suitable for a detour transmits wavelength multiplexed optical signals with wavelengths $\lambda 1$ through $\lambda m$, which have been transmitted through the reserve optical transmission lines k2 on the input port, to the output reserve optical transmission lines k2, without separating them according to wavelength.

When link failure occurs in the working optical transmission lines, the bypass component 2, for example, connects the connection links k4 and the reserve optical transmission lines k2 by the path indicated by the dotted line, and transmits wavelength multiplexed optical signals with a wavelength $\lambda 1$ through $\lambda j$ to the reserve optical transmission lines k2.

Figure 5:
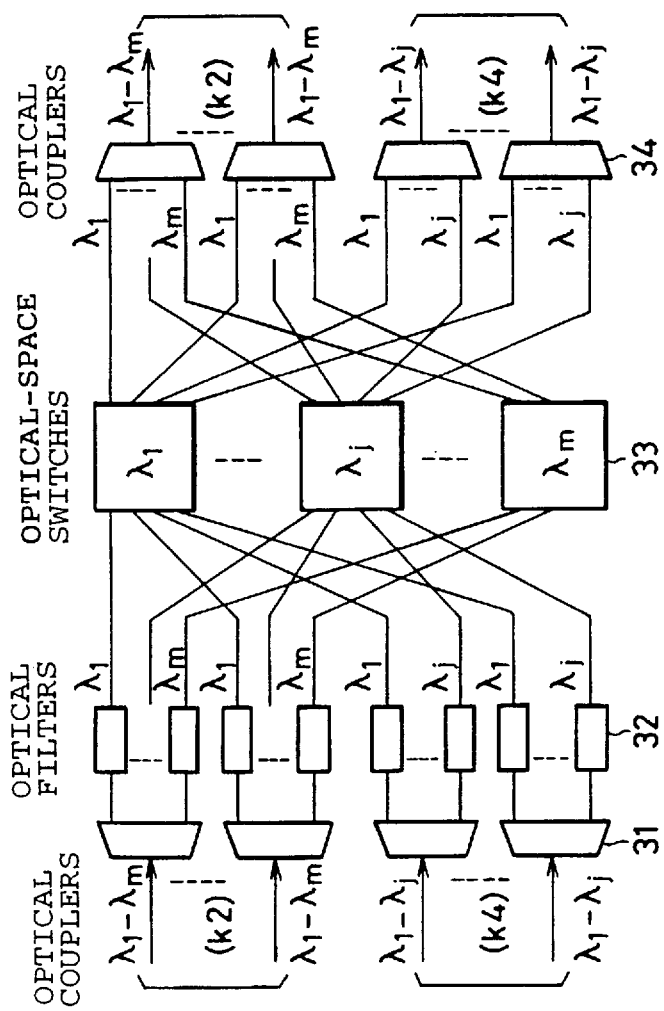
FIG. 5 is an illustration of a bypass component suitable for the Type B path rerouting method.

FIG. 5 is an illustration of a bypass component 2 suitable for the aforementioned Type B path rerouting method. 31 indicates optical couplers for splitting wavelength multiplexed optical signals, 32 indicates optical filters for separating wavelengths, 33 indicates optical-space switches corresponding to wavelength, and 34 indicates optical couplers for wavelength multiplexing.

Wavelength multiplexed optical signals that have been transmitted through reserve optical transmission lines k2 and connection links k4 are first split by the optical couplers 31 and are filtered by the optical filters 32 according to the wavelength $\lambda 1$ through $\lambda m$ of the optical signals. The output port for the filtered optical signals is switched by the optical-space switches 33 according to wavelength 11 through $\lambda m$. The optical signals with differing wavelengths $\lambda 1$ through $\lambda m$ are then combined by the optical couplers 34 and are transmitted to the reserve optical transmission lines k2 and to the connection links k4.

Figure 6:
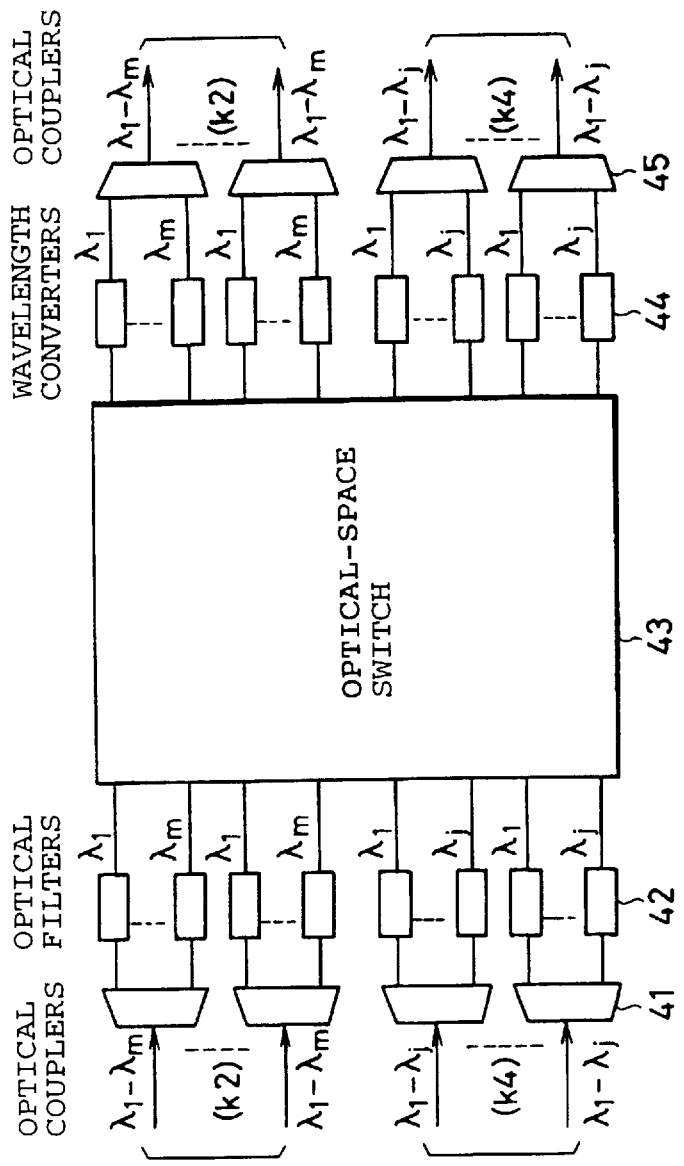
FIG. 6 is an illustration of a bypass component. suitable for the Type C path rerouting method.

FIG. 6 is an illustration of a bypass component 2 suitable for the aforementioned Type C path rerouting method. 41 indicates optical couplers for splitting wavelength multiplexed optical signals, 42 indicates optical filters for separating wavelengths, 43 indicates an optical-space switch, 44 indicates wavelength converters for converting to the desired wavelength, and 45 indicates optical couplers for wavelength multiplexing.

This bypass component 2 comprises optical couplers 41, optical filters 42, an optical-space switch 43, wavelength converters 44, and optical couplers 45, and has a structure similar to the routing component shown in FIG. 3. The optical signals are converted to desired wavelengths by wavelength converters 44 connected to the output side of the optical-space switch 43, and are combined by the optical couplers 45. Accordingly, there is substantial latitude for forming a path between the reserve optical transmission lines k2 and connection links k4.

Figure 7:
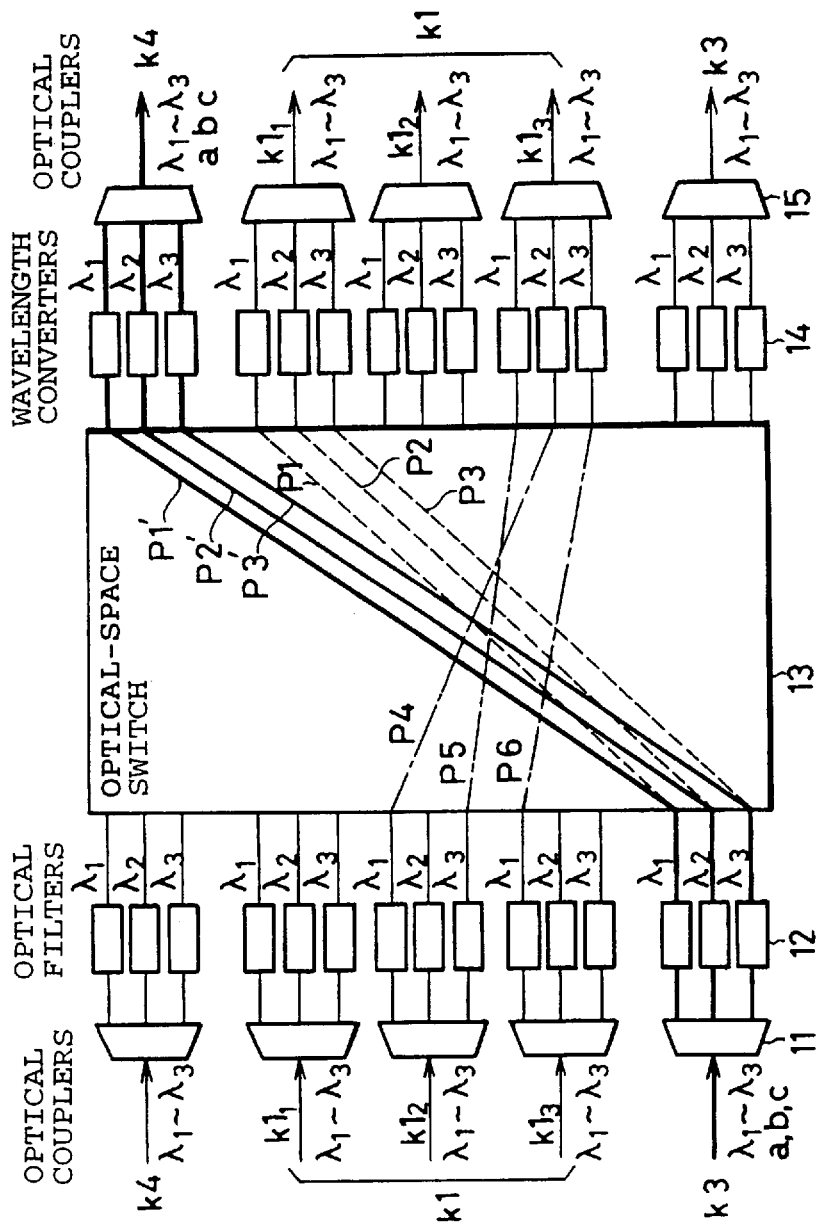
FIG. 7 is an illustration of a routing component when link failure occurs in the working optical transmission lines of the first preferred embodiment.

FIG. 7 is an illustration of the routing component 1 when link failure occurs in the working optical transmission lines k1 in the first preferred embodiment. Parts that are the same as those in FIG. 3 are indicated by the same symbols. Only optical signals with wavelengths $\lambda 1$ through $\lambda 3$ are indicated in FIG. 7, but a large number of optical signal wavelengths can undergo multiplexing. In FIG. 7, there are three working optical transmission lines k1 ($k1_1$ through $k1_3$), there is one interface link k3, and there is one connection link k4, although k1, k3, and k4 can be multiple numbers as well.

During normal operation, paths P1 through P6, for example, are formed in the optical-space switch 13. Thus, optical signals a, b, and c with wavelengths $\lambda 1$ through $\lambda 3$ are input from an electrical cross-connect device (not shown in figure) through the interface link k3, and are transmitted via paths P1 through P3 to the working optical transmission lines $k1_1$.

Optical signals with a wavelength $\lambda 1$ in the input working optical transmission line $k1_2$ is transmitted by a path P4 to the output side, and is converted to wavelength $\lambda 2$ by the wavelength converter 14. Optical signal with a wavelength $\lambda 3$ in the input working optical transmission line $k1_2$ is transmitted to the output port by path P5, and is converted to a wavelength $\lambda 1$ by the wavelength converter 14. Optical signal with a wavelength $\lambda 1$ in the input working optical transmission line $k1_3$ is transmitted to the output port by path P6, and is converted to a wavelength $\lambda 3$ by the wavelength converter 14. All the optical signals undergo multiplexing by the optical coupler 15 and are transmitted to the output working optical transmission line $k1_3$.

When link failure occurs in the output working optical transmission line $k1_1$, paths P1 through P3 in the optical-space switch 13 are switched to paths P1' through P3' by a control component (not shown in figure). As a result, the interface link k3 on the input port of the routing component 1 is connected to the output connection link 4.

Figure 8:
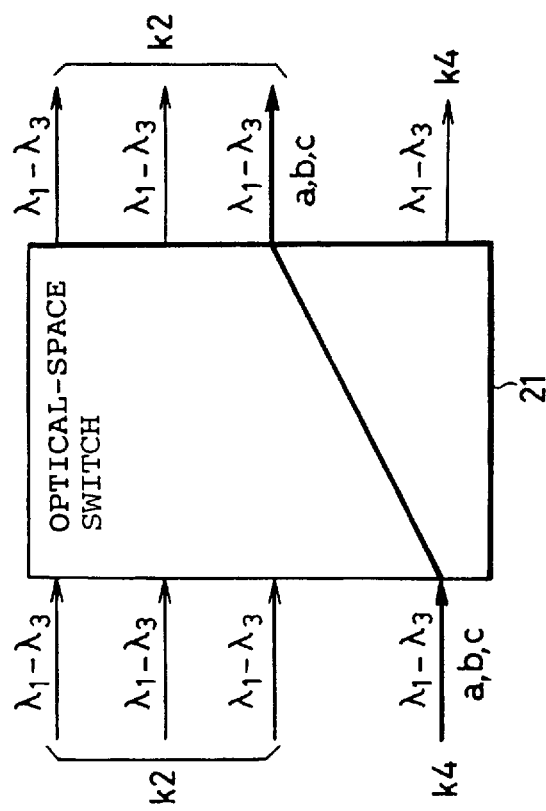
FIG. 8 is an illustration of a Type A bypass component.

FIG. 8 is an illustration of the aforementioned Type A bypass component 2. This illustrates a case in which the bypass component 2 is constructed of an optical-space switch 21. This indicates a case of the rerouting method in FIG. 2(b). As shown in FIG. 7, paths P1 through P3 were switched to paths P1' through P3' by the optical-space switch 13 in the routing component 1. Thus, wavelength multiplexed optical signals containing optical signals a, b, and c with wavelengths $\lambda 1$ through $\lambda 3$ which have been transmitted to the connection link k4 are input to the optical-space switch 21 of the bypass component 2. As a result, the path indicated by the solid path in the optical-space switch 21 is formed. That is, the connection link k4 is connected with the reserve optical transmission line k2 of the optical cross-connect device III.

When a path is formed in the optical-space switch 21, the bypass component 2 of optical cross-connect device III connects the reserve optical transmission line k2 on the optical cross-connect device I side with the reserve optical transmission line k2 on the optical cross-connect device IV side. Accordingly, when link failure occurs in the working optical transmission lines between optical cross-connect devices I and IV, the optical-space switch 21 of the bypass component 2 forms a detour using the reserve optical transmission lines passing through the optical cross-connect device III to continuously transmit wavelength multiplexed optical signals.

Figure 9:
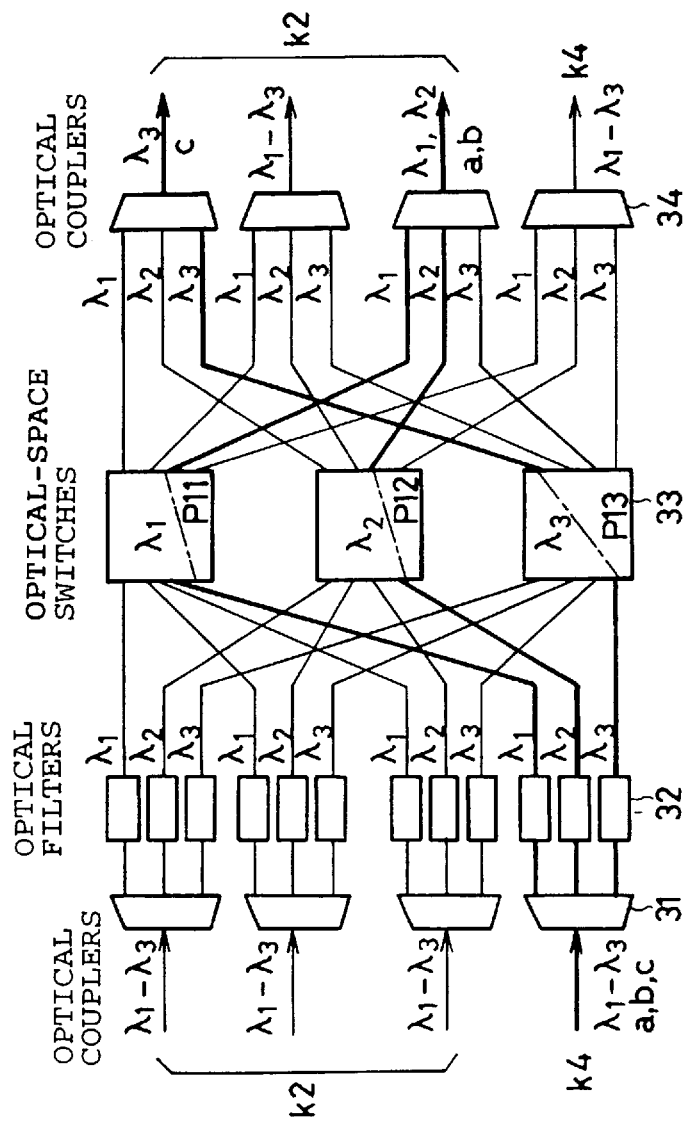
FIG. 9 is an illustration of a Type B bypass component.

FIG. 9 is an illustration of the aforementioned Type B bypass component 2. This illustrates a case in which the bypass component 2 is constructed of optical couplers 31, optical filters 32, optical-space switches 33 corresponding to wavelength, and optical couplers 34. This shows a case involving the rerouting method in FIG. 2(c).

In the routing component 1 of the optical cross-connect device I shown in FIG. 2(c), paths P1 through P3 are switched to paths P1' through P3' by the optical-space switch 13 (see FIG. 7). Thus, in the bypass component 2, the connection link k4 and the reserve optical transmission lines k2 on the optical cross-connect devices II and III sides are connected by the optical-space switches 33 according to wavelength, as in the routes shown by the thick paths in FIG. 9.

In the bypass component 2 of the optical cross-connect device II, the optical-space switches 33 are controlled wavelength, so that optical signals c with a wavelength $\lambda 3$ is transmitted to the reserve optical transmission line on the optical cross-connect device VI side. In the bypass component 2 of the optical cross-connect device III, the optical-space switches 33 are controlled, so that optical signal a with a wavelength $\lambda 1$ is transmitted to the reserve optical transmission line on the optical cross-connect device VII side, and optical signals b with a wavelength $\lambda 2$ is transmitted to the reserve optical transmission line on the optical cross-connect device V side.

Figure 10:
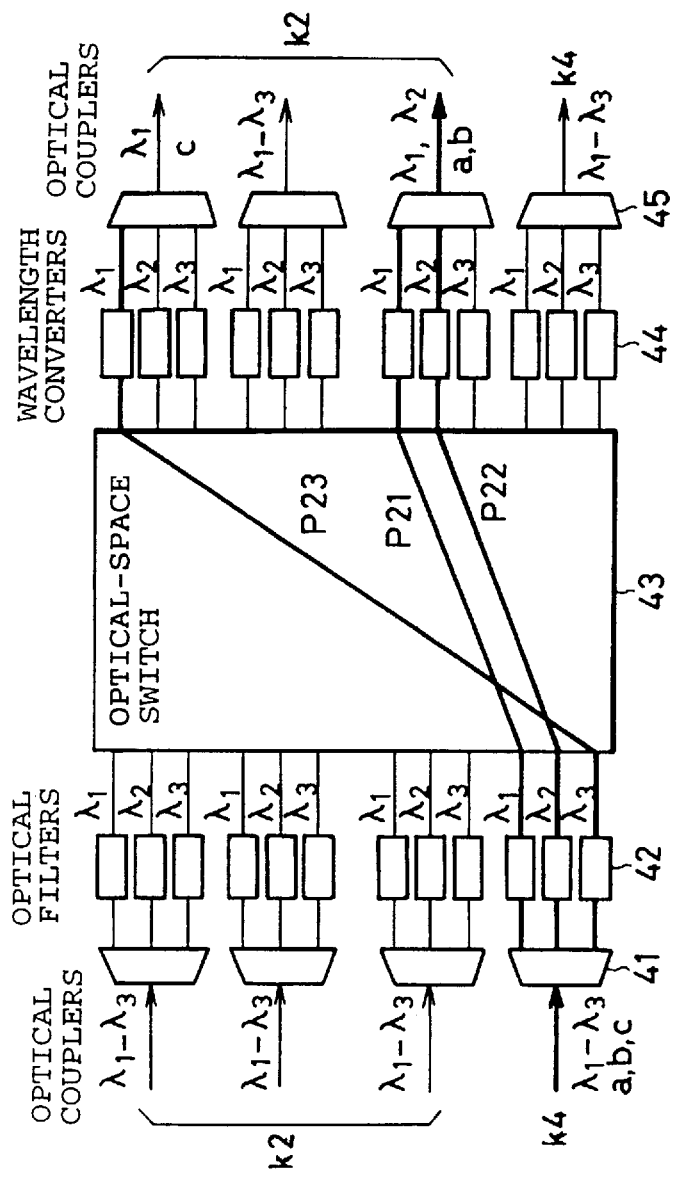
FIG. 10 is an illustration of a Type C bypass component.

FIG. 10 is an illustration of the aforementioned Type C bypass component 2. Parts that are the same as in FIG. 6 are indicated by the same symbols. This indicates a case of the rerouting method in FIG. 2(d). In this case, the optical signals a and b are transmitted to the reserve optical transmission lines on the optical cross-connect device III side, and the wavelengths are converted. The optical signal c is transmitted to the reserve optical transmission line on the optical cross-connect device II side, and the wavelengths are converted.

That is, the routing component 1 in the optical cross-connect device I switches the working optical transmission line to the connection link k4 side when link failure occurs in the working optical transmission line on the optical cross-connect device IV side. In the bypass component 2, the wavelength multiplexed signals transmitted form the connection link k4 is split by the optical coupler 41 and is filtered in the form of optical signals a, b, and c with wavelengths $\lambda 1$ through $\lambda 3$ by the optical filters 42. Bypass component 2 then forms paths P21 and P22 in which the optical signals a and b with wavelengths $\lambda 1$ and $\lambda 2$ are transmitted by the optical-space switch 43 to reserve optical transmission line k2 on the optical cross-connect device III side. The bypass component 2 forms a path P23 in which the optical signal c with a wavelength $\lambda 3$ is transmitted by the optical-space switch 43 as optical signal with a wavelength $\lambda 1$ to the reserve optical transmission line k2 on the optical cross-connect device II side. In the bypass component 2, the optical signal c with a wavelength $\lambda 3$ is converted by wavelength converters 44 to a wavelength of λ1, and the optical signal c with a wavelength λ1 undergo multiplexing by the optical couplers 45 and is transmitted.

FIG. 10 illustrates a case in which the transmission line for wavelength λ3 among the reserve optical transmission lines k2 on the optical cross-connect device II side is in use, the transmission line for wavelength λ1 is empty, and optical signal c is being transmitted with the use of the empty transmission line for wavelength λ1. When only the transmission line for wavelength λ2 is empty, the optical-space switch 43 forms a path in which optical signal c with a wavelength λ3 are converted to a wavelength λ2 and transmitted.

The bypass component 2 of the optical cross-connect device II transmits the optical signal c with a wavelength λ1, which have been transmitted from the optical cross-connect device I through the reserve optical transmission line k2, to the reserve optical transmission line k2 on the optical cross-connect device VI side, without converting the wavelength of the signal. The bypass component 2 of the optical cross-connect device III separates by wavelength the optical signals a and b with wavelengths λ1 and λ2 which have been transmitted from the optical cross-connect device I to the reserve optical transmission line k2. The bypass component 2 then outputs the optical signal a with a wavelength λ1 to the reserve optical transmission line k2 on the optical cross-connect device VII side, converts the wavelengths λ2 of signal b to a wavelength λ1, and transmits the optical signal b with a wavelength λ1 to the reserve optical transmission line k2 on the optical cross-connect device V side. The bypass component 2 thus selects and connects output lines according to wavelength.

Because Type A switches the working optical transmission lines k1 all at once to the reserve optical transmission lines k2, the structure and control are simple. In this case, the reserve optical transmission lines k2 must be empty. Type B selects output lines according to wavelength among the working optical transmission lines k1. Type B accordingly can detour and transmit optical signals in the working optical transmission lines k1 according to the empty state of the reserve optical transmission lines k2. Type C utilizes empty wavelengths in the reserve optical transmission lines k2. In Type C, the wavelength of the optical signals detoured and transmitted to the empty wavelengths must be converted. Type C must accordingly control the selection of the empty wavelengths, and is suitable for VWP networks. Type C allows a system with the greatest latitude to be devised.

FIG. 11 is a comparison of the structures of the first preferred embodiment of the present invention. In the figure, Types A, B, and C of the first preferred embodiment of the present invention are compared with a conventional technique. The comparison is made in terms of the number of 2×2 optical switches constituting the optical-space switch, the number of wavelength converters, and the number of optical filters.

A shows the number of the optical filters, the wavelength converters, the 2×2 optical switches (constituting the optical-space switch) in terms of equations using as constants n, m, i, and j, respectively, and the number k1 of working optical transmission lines, the number k2 of reserve optical transmission lines, the number k3 of interface links, and the number k4 of connection links.

For B, n=m=i=j=4. When there are 4 working optical transmission lines, single link failure can be resolved with one connection link k4. In this case, 1296 optical switches are needed to constitute the optical-space switch in the conventional technology. In the present invention, however, the routing component has 576 optical switches, and the bypass component has 25 optical switches in Type A, 100 switches in Type B, and 400 switches in Type C.

C is a case in which n=m=i=j=8, and k1=8, k2=8, k3=2, and k4=2. When there are 8 working optical transmission lines k1, twice as many as in B, there are 2 connection links, also twice as many as in B. That is, when there is double link failure in the 8 working optical transmission lines k1, this situation can be resolved by the structure of C. 20736 optical switches would be needed in the conventional technology for similar cases. In the present invention, however, the routing component has 9216 optical switches, and by bypass component has 100 optical switches in Type A, 800 in Type B, and 6400 in Type C.

The first embodiment of the present invention and the conventional technology are compared in terms of the required number of optical switches. In Types A and B of the present invention, the number is about 44 to 52% lower, while it is about 75% lower in Type C. The necessary number of optical filters and wavelength Converters in the present invention is about 20% more than in the conventional technique, but the hardware size of the optical cross-connect device in the present invention can be made smaller than that in the conventional technology.

Second Embodiment

Figure 12:
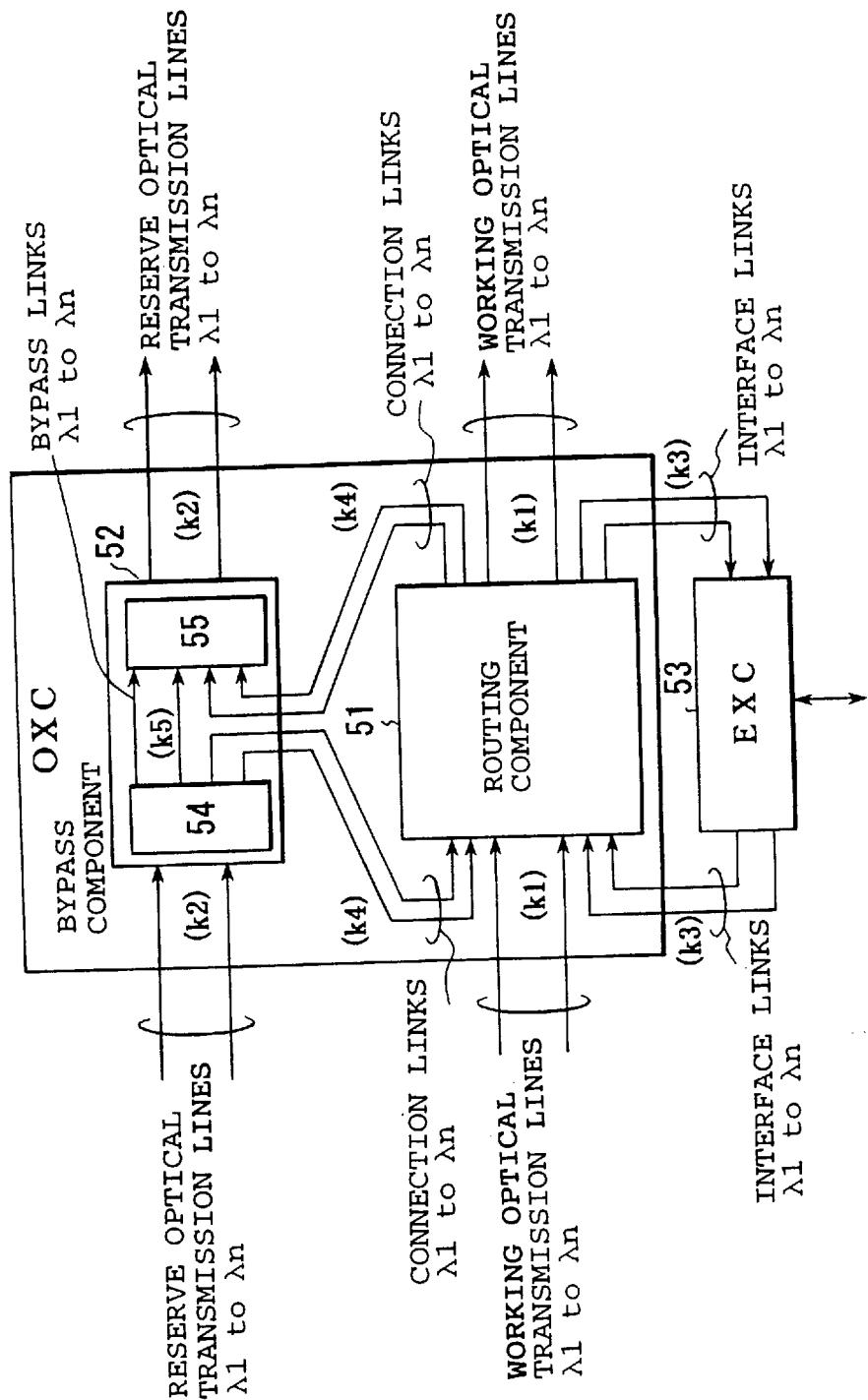
FIG. 12 is an illustration of a second preferred embodiment of the present invention.

FIG. 12 is an illustration of a second preferred embodiment of the present invention. OXC indicates an optical cross-connect device, 51 indicates a routing component, 52 indicates a bypass component, 53 indicates an electrical cross-connect device (EXC), 54 indicates a first optical-space switch, 55 indicates a second optical-space switch, k1 indicates working optical transmission lines, k2 indicates reserve optical transmission lines, k3 indicates interface links with the electrical cross-connect device 53, k4 indicates connection links connecting the routing component 51 with the output port of the first optical-space switch 54 of the bypass component 52 and with the input port of the second optical-space switch 55, and k5 indicates bypass links connecting the first optical-space switch 54 and the second optical-space switch 55.

The routing component 51 and the electrical cross-connect device 53 have a structure similar to that in the first preferred embodiment described above. Link failure does not normally occur simultaneously in all of the working optical transmission lines k1. There may accordingly be fewer numbers of reserve optical transmission lines k2, connection links k4, and bypass links k5. The structure of the bypass component 52 is thus simpler.

Figure 13:
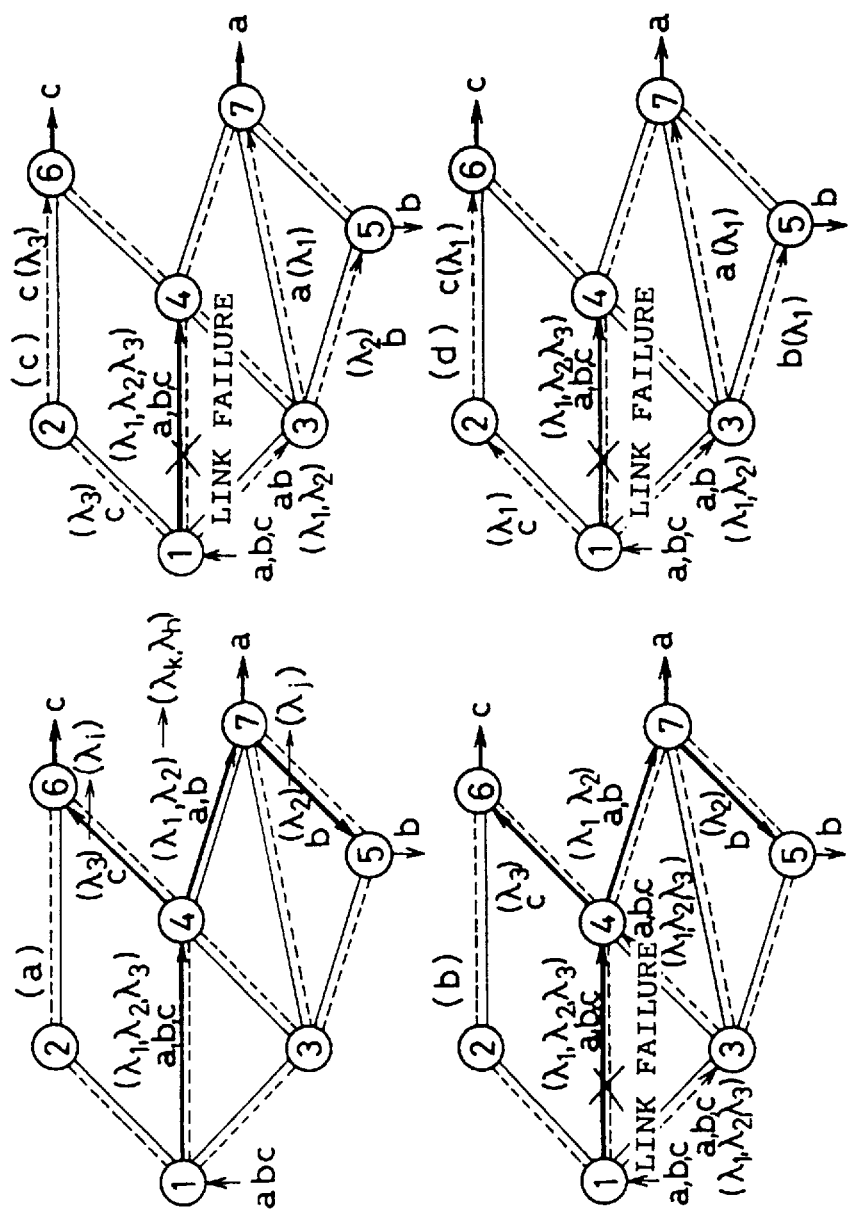
FIG. 13 is an illustration of a bath rerouting method.

FIG. 13 is an illustration of a path rerouting method. This figure indicates a structure corresponding to that in FIG. 2, and illustrates optical cross-connect devices I through VII. FIG. 13(a) is an illustration of normal operation, while FIGS. 13(b) through (d) are of cases in which link failure has occurred. The solid lines connecting the optical cross-connect device I through VII indicate working optical transmission lines, while the dotted lines indicate reserve optical transmission lines. FIG. 13 shows cases in which optical signals a, b, and c with wavelengths λ1, λ2, and λ3 are transmitted from the optical cross-connect device I to optical cross-connect devices VII, V, and VI, respectively.

FIG. 13(a) illustrates a case in a WP or VWP network. Optical signal c with a wavelength λ3, which are transmitted from the optical cross-connect device I through the optical cross-connect device IV to the optical cross-connect device VI along the working optical transmission line indicated by the solid line arrow. Optical signals a and b with wavelengths $\lambda 1$ and $\lambda 2$, which are transmitted from optical cross-connect device I through optical cross-connect device IV to optical cross-connect device VII along the working optical transmission line indicated by the solid line arrow. Optical signal b with a wavelength $\lambda 2$ is transmitted through optical cross-connect device VII to optical cross-connect device V along the working optical transmission line indicated by the solid line arrow.

In the case depicted, wavelengths are converted in a VWP network. In the optical cross-connect device IV, for example, optical signals a, b, and c are converted from $\lambda 3$ to $\lambda i$, $\lambda 1$ to $\lambda k$, and $\lambda 2$ to $\lambda h$, and transmitted. In the optical cross-connect device VII, optical signal b is converted from wavelength $\lambda 2$ to $\lambda j$ and transmitted.

When link failure has occurred in the working optical transmission line between optical cross-connect devices I and IV, the present invention allows any of the port rerouting shown in FIGS. 13(b), (c), or (d). In the same manner as in the case depicted in FIG. 2 above, the method illustrated in FIG. 13(b) is Type A, that in FIG. 13(c) is Type B, and that in FIG. 13(d) is Type C, which are described below.

Type A shown in FIG. 13(b) is suitable for WP or VWP networks. Type A utilizes reserve optical transmission lines that pass through the optical cross-connect device III. That is, the optical cross-connect device I controls the routing component 51 and bypass component 52 (see FIG. 12), and the wavelength multiplexed optical signals transmitted to the working optical transmission line where link failure has occurred are switched through the connection link k4 to the reserve optical transmission line k2 and transmitted. In the optical cross-connect device III connected via reserve optical transmission lines k2, the reserve optical transmission lines k2 connected with the optical cross-connect device I and the reserve optical transmission lines k2 connected with the optical cross-connect device IV are connected via the bypass links k5 of the bypass component 52 (see FIG. 12) [to transmit] the wavelength multiplexed optical signals. Or, the wavelength multiplexed optical signals are transmitted in the optical cross-connect device III from the reserve optical transmission line k2 through the working optical transmission line k1 by the following route: from the reserve optical transmission line k2 to the bypass component 52 optical-space switch 54 to the connection link k4 to the routing component 51 to the working optical transmission line k1. Accordingly, wavelength multiplexed optical signals involving the multiplexing of optical signals a, b, and c with wavelengths $\lambda 1$, $\lambda 2$, and $\lambda 3$ are transmitted along the route indicated by the broken line arrow via a detour through the optical cross-connect device III.

Type B shown in (c) is suitable for a WP or VWP network in the same manner as Type A. Type B is of a case provided with a function capable of separation according to wavelength. When link failure occurs in the working optical transmission lines k1 between the optical cross-connect devices I and IV, the optical cross-connect device I separates the signals according to wavelength. Thus, optical signals a and b with wavelengths $\lambda 1$ and $\lambda 2$ are transmitted to reserve optical transmission lines k2 on the optical cross-connect device III side, and optical signal c with a wavelength $\lambda 3$ is transmitted to reserve optical transmission lines k2 on the optical cross-connect device II side. Thus, optical cross-connect device m transmits optical signal a with a wavelength $\lambda 1$ to the reserve optical transmission lines k2 on the optical cross-connect device VII side. The optical cross-connect device III also transmits optical signal b with a wavelength $\lambda 2$ to the reserve optical transmission lines k2 on the optical cross-connect device V side. The optical cross-connect device II transmits optical signal c with a wavelength $\lambda 3$ to the reserve optical transmission lines k2 on the optical cross-connect device VI side. The optical signals a, b, and c thus are transmitted to the desired node through reserve optical transmission lines k2 in the form of wavelengths $\lambda 1$, $\lambda 2$, and $\lambda 3$, respectively.

Type C shown in (d) is suitable for VWP networks equipped with a wavelength conversion function. When link failure occurs in a working optical transmission line k1 between optical cross-connect devices I and IV, the optical cross-connect device I transmits optical signals a and b with wavelengths $\lambda 1$ and $\lambda 2$ to reserve optical transmission lines k2 on the optical cross-connect device III side, and transmits optical signals c with a wavelength $\lambda 3$ to reserve optical transmission lines k2 on the optical cross-connect device II side. When wavelength $\lambda 3$ is not empty on reserve optical transmission lines connected to the optical cross-connect device II side, the optical cross-connect device I converts optical signal c with a wavelength $\lambda 3$ to wavelength $\lambda 1$ and transmits it to reserve optical transmission lines k2 on the optical cross-connect device II side. The optical cross-connect device III transmits optical signal a with a wavelength $\lambda 1$ to reserve optical transmission lines k2 on the optical cross-connect device VII side, and transmits optical signal b with a wavelength $\lambda 2$ to the reserve optical transmission lines k2 on the optical cross-connect device V side. When wavelength $\lambda 2$ is not empty on the optical cross-connect device V side at this time, the optical cross-connect device III converts optical signal b with a wavelength $\lambda 2$ to wavelength $\lambda 1$ and transmits it to the reserve optical transmission lines k2 on the optical cross-connect device V side. The optical cross-connect devices thus utilize empty wavelengths in the reserve optical transmission lines to form detours.

Figure 14:
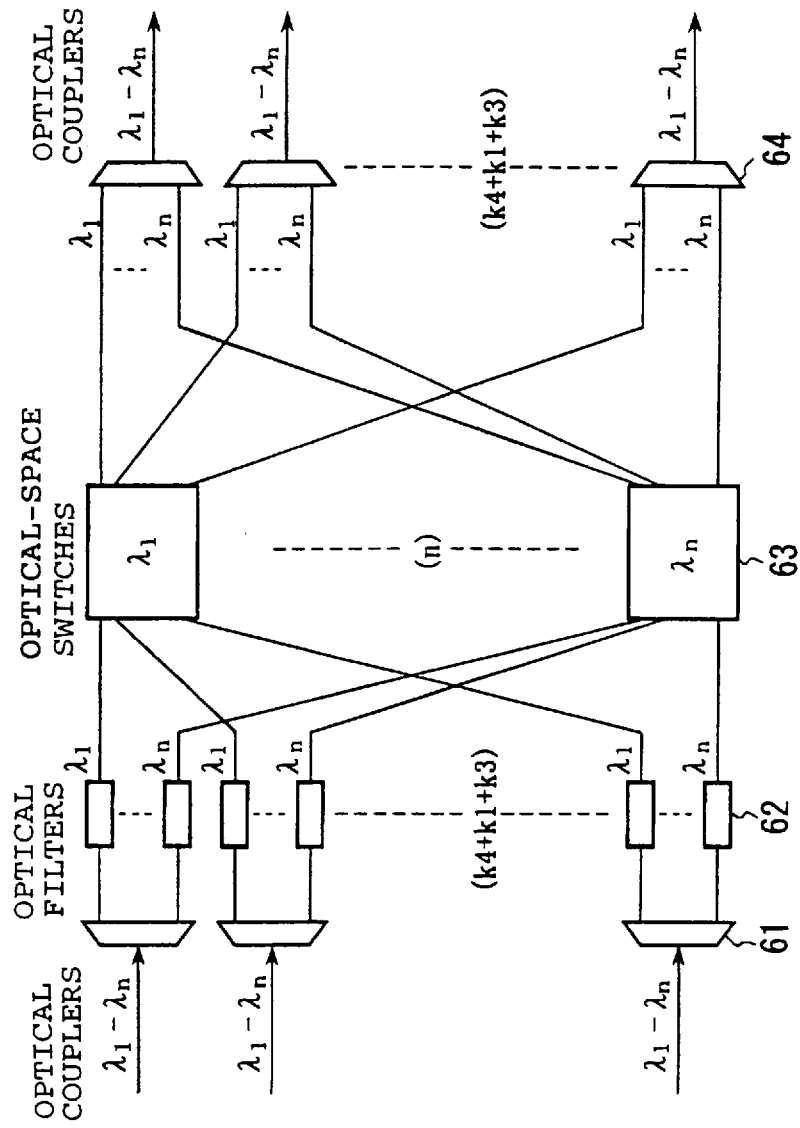
FIG. 14 is an illustration of a routing component for a WP network.

FIG. 14 is an illustration of the routing component 51 for a WP network. 61 indicates optical couplers, 62 indicates optical filters, 63 indicates optical-space switches, and 64 indicates optical couplers. The connection links k4, working optical transmission lines k1, and interface links k3 are connected to routing component. The input and output sides are indicated as (k4+k1+k3).

Wavelength multiplexed optical signals with wavelengths $\lambda 1$ through $\lambda n$ are split by the optical couplers 61. The optical signals are then selected according to wavelength by the optical filters 62 into wavelengths $\lambda 1$ through $\lambda n$. The optical-space switch 63 switches output ports of each wavelength signal. The optical signals from the optical space switches are input to the optical couplers 64, where they are combined and transmitted as wavelength multiplexed optical signals.

Figure 15:
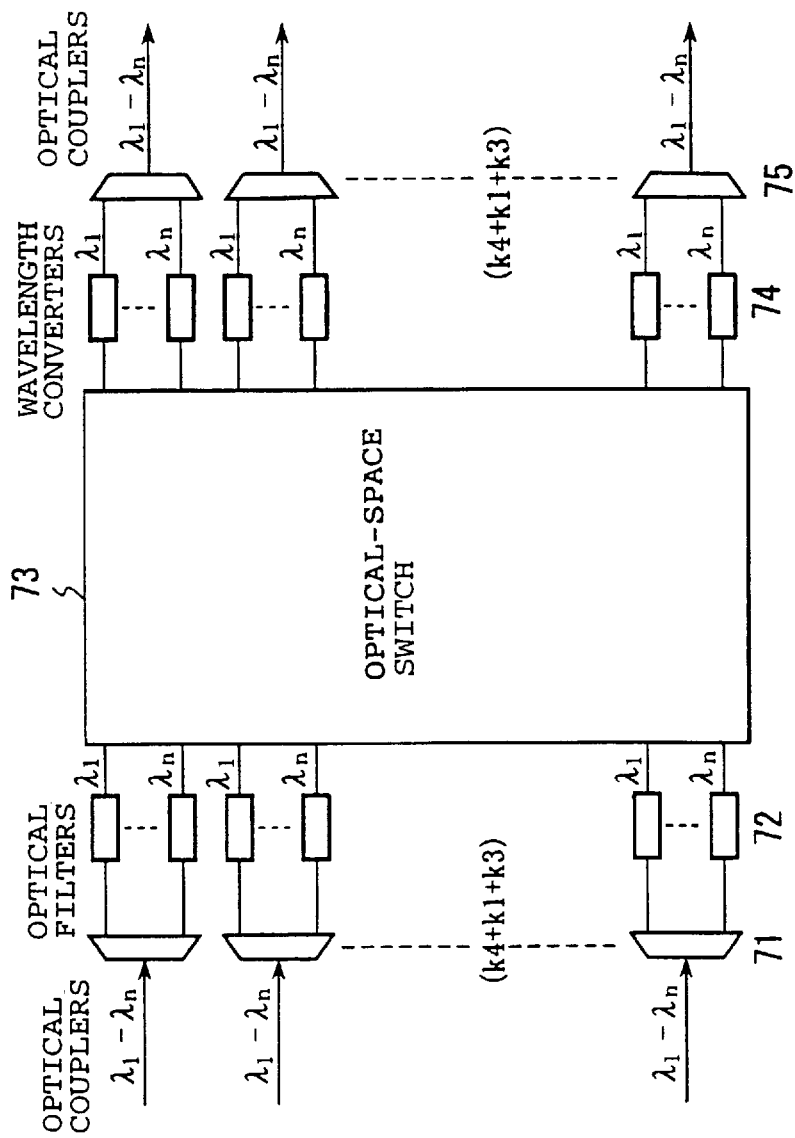
FIG. 15 is an illustration of a routing component for a VWP network.

FIG. 15 is an illustration of the routing component 51 for a VWP network. 71 indicates optical couplers, 72 indicates optical filters, 73 indicates an optical-space switch, 74 indicates wavelength converters, and 75 indicates optical couplers. In contrast to the routing component 1 in FIG. 14, wavelength converters 74 are provided before the optical couplers 75 on the output port. The wavelength converters 74 convert wavelengths, so that optical signals of the same wavelength are transmitted to the same output line.

Figure 16:
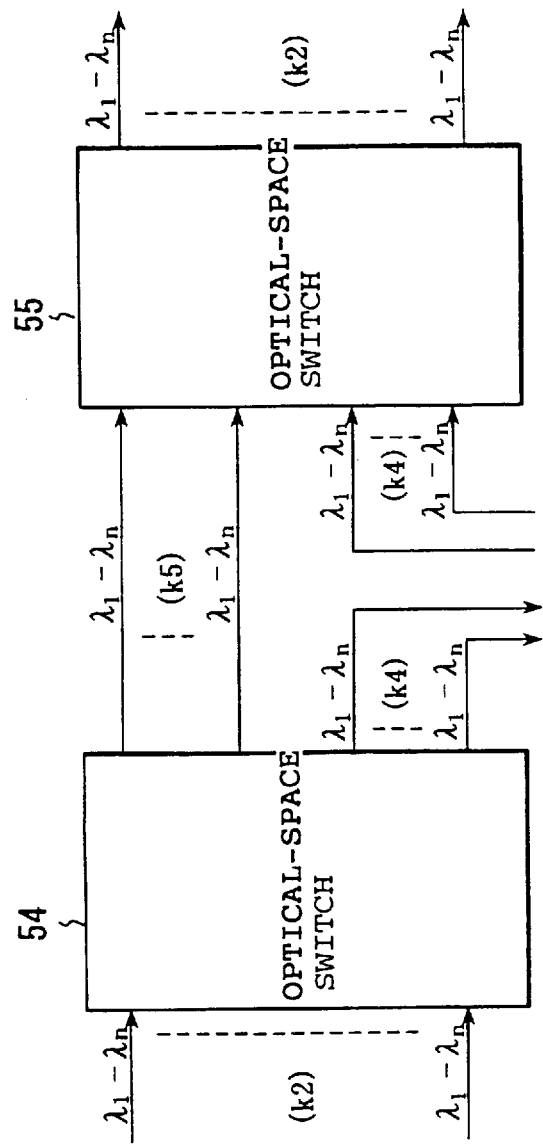
FIG. 16 is an illustration of a Type A bypass component.

FIG. 16 is an illustration of a Type A bypass component 52. 54 indicates a first optical-space switch, and 55 indicates a second optical-space switch. The first optical-space switch 54 and second optical-space switch 55 are connected to reserve optical transmission lines k2 in the same manner as shown in FIG. 12. The first optical-space switch 54 and second optical-space switch 55 are connected via bypass links k5. The output port of the first optical-space switch 54 and the input port of the routing component 51, and the input port of the second optical-space switch 55 and the output port of the routing component 51, are connected via the connection links k4. This Type A bypass component 52 connects the reserve optical transmission lines k2 with the bypass links k5, in a wavelength multiplexed optical signal state. This Type A bypass component 52 also connects the reserve optical transmission lines k2 with the connection links k4. In this case, the connection links k4 and bypass links k5, as described above, are fewer in number than the reserve optical transmission lines k2.

Figure 17:
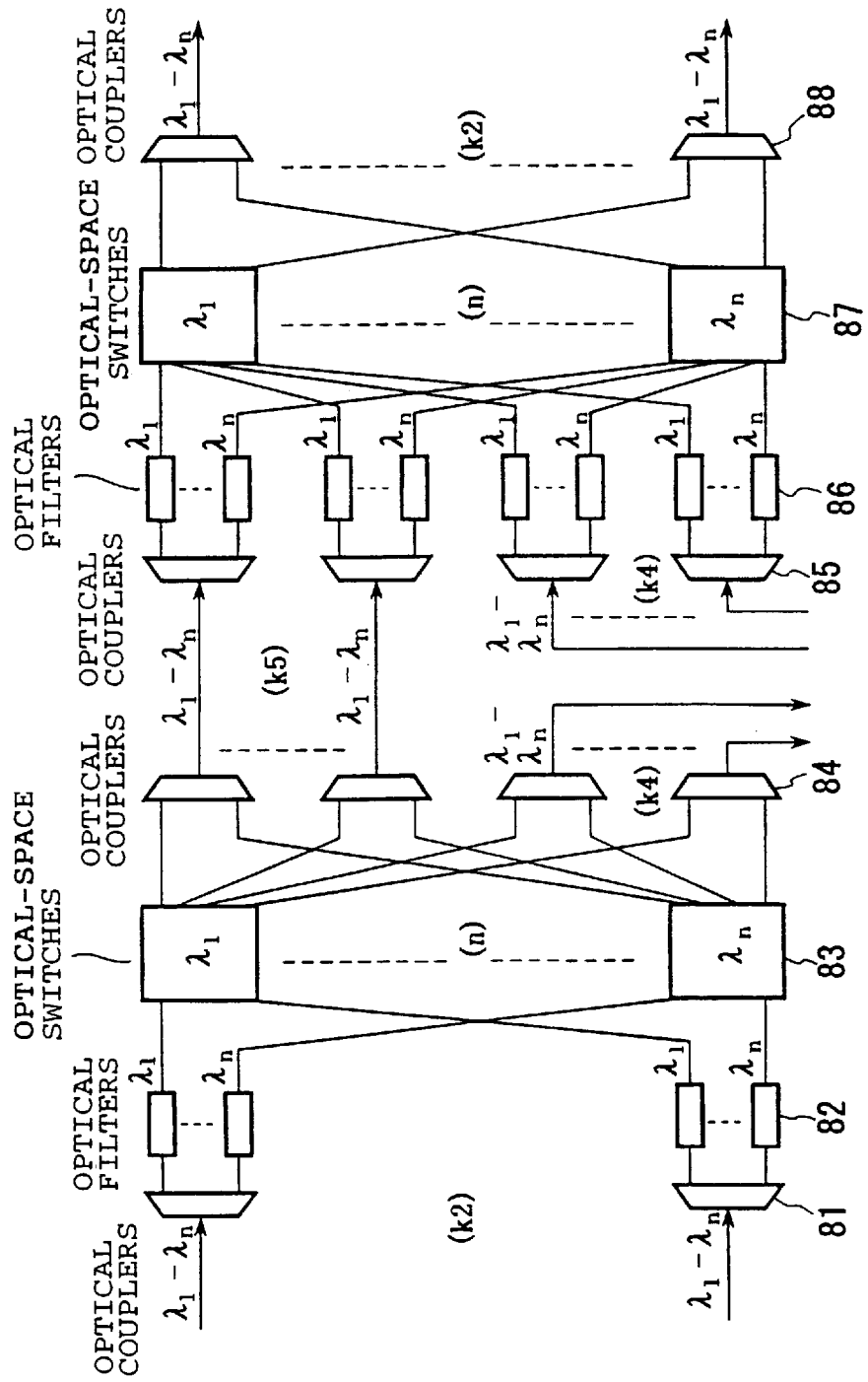
FIG. 17 is an illustration of a Type B bypass component.

FIG. 17 is an illustration of a Type B bypass component 52. 81 indicates optical couplers, 82 indicates optical filters, 83 indicates first optical-space switches, 84 and 85 indicate optical couplers, 86 indicates optical filters, 87 indicates second optical-space switches, and 88 indicates optical couplers. The wavelength multiplexed optical signals transmitted through the reserve optical transmission lines k2 are split by the optical couplers 81. The optical signals are then divided according to wavelengths $\lambda 1$ through $\lambda n$ by the optical filters 82. The optical signals are switched by the first optical-space switches 83 according to wavelength, and are combined by the optical couplers 84. The combined wavelength multiplexed optical signals are then transmitted through the bypass links k5 to the optical couplers 85 and through the connection links k4 to the routing component 51.

The wavelength multiplexed optical signals transmitted through the bypass links k5 are split by the optical couplers 85. The wavelength multiplexed optical signals transmitted through the connection links k4 are divided by optical couplers 85. The wavelength multiplexed optical signals are then separated by the optical filters 86 according to wavelengths $\lambda 1$ through $\lambda n$. The optical signal are switched by the second optical-space switches 87 according to wavelength, and are combined by the optical couplers 88. The combined wavelength multiplexed optical signals are transmitted to the reserve optical transmission lines k2.

Figure 18:
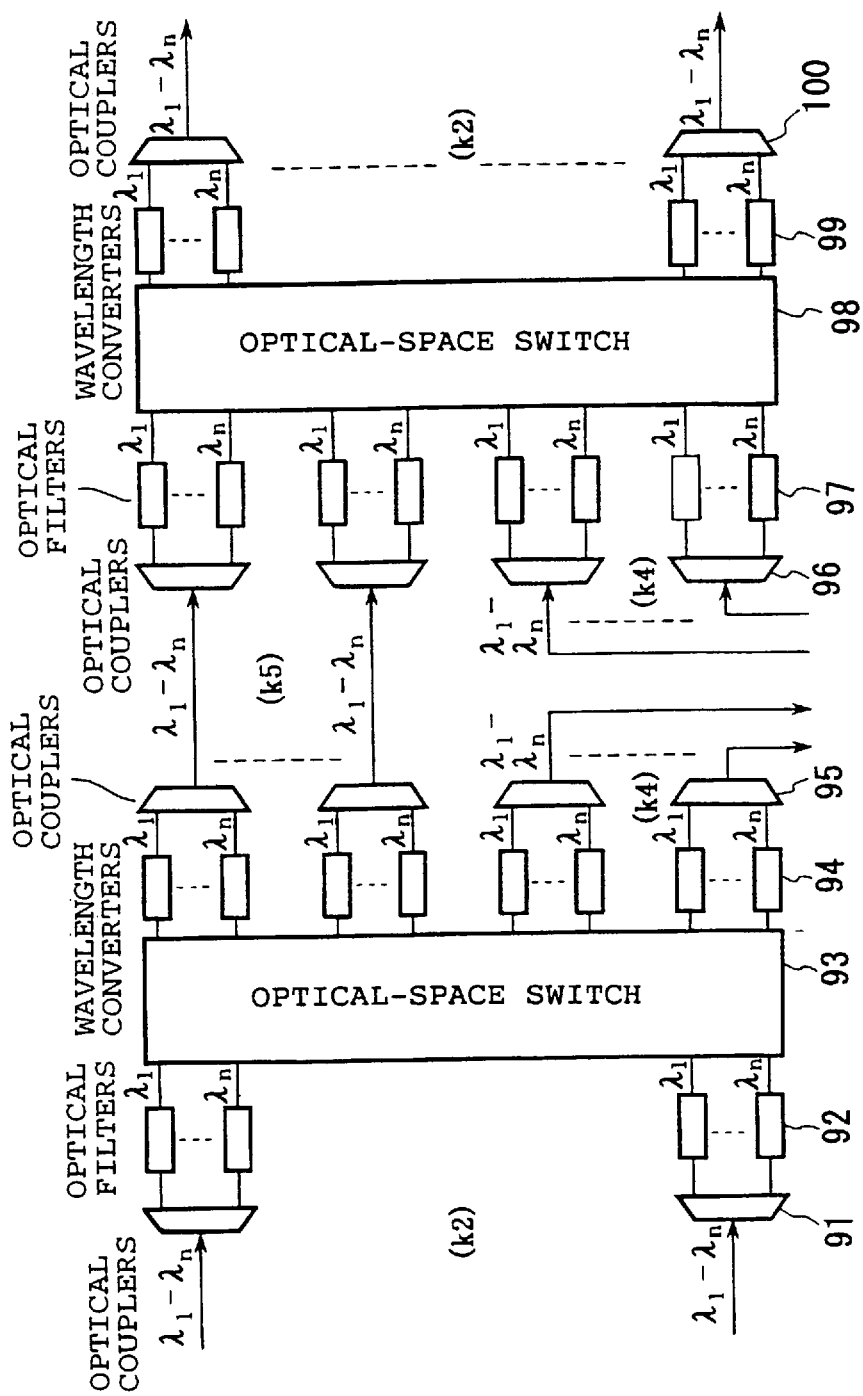
FIG. 18 is an illustration of a Type C bypass component.

FIG. 18 is an illustration of a Type C bypass component 52. 91 indicates optical couplers, 92 indicates optical filters, 93 indicates a first optical-space switch, 94 indicates wavelength converters, 95 and 96 indicate optical couplers, 97 indicated optical filters, 98 indicates a second optical-space switch, 99 indicates wavelength converters, and 100 indicates optical couplers. This Type C bypass component 52 corresponds to the structure of the Type B bypass component 52 shown in FIG. 17, but is equipped with wavelength converters between the optical couplers and the first and second optical-space switches. This Type C bypass component 52 allows the routing component 51 or reserve optical transmission lines k2 to be selected according to wavelength, and allows wavelengths to be converted by the wavelength converters 94 and 99 so that optical signals of the same wavelength are prevented from undergoing multiplexing.

Figure 19:
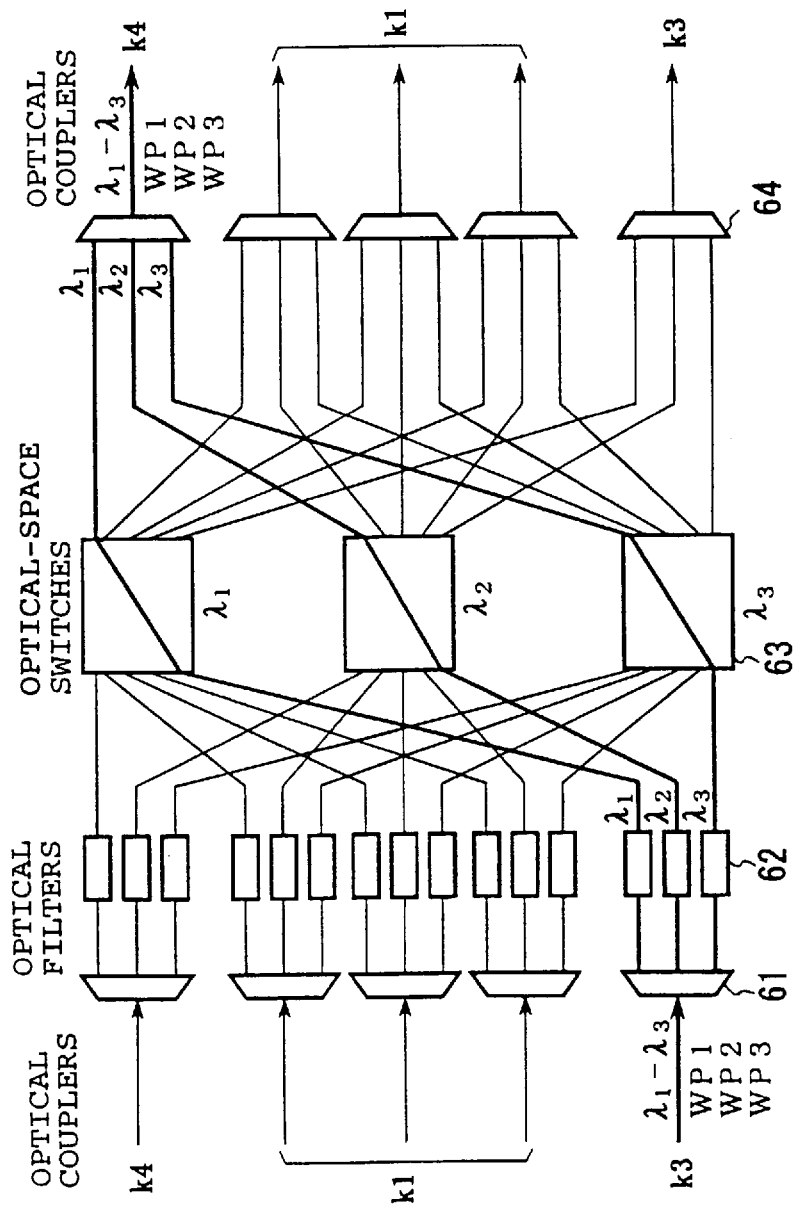
FIG. 19 is an illustration of path rerouting with a routing component in a WP network.

FIG. 19 is an illustration of the path rerouting of the routing component 51 in a WP network. Parts that are the same as those in FIG. 14 are indicated by the same symbols. When optical signals WP1 through WP3 with wavelengths $\lambda 1$ through $\lambda 3$ are added from an electrical cross-connect device through the interface links k3 to the routing component 51, the optical-space switch 63 forms a path on the working optical transmission line k1 side according to wavelength. When link failure occurs in the working optical transmission line k1, the optical-space switch 63 is switched and controlled. That is, a path is formed, as indicated by the thick path, to the bypass component 52, connecting the connection link k4 to the reserve optical transmission line k2.

Figure 20:
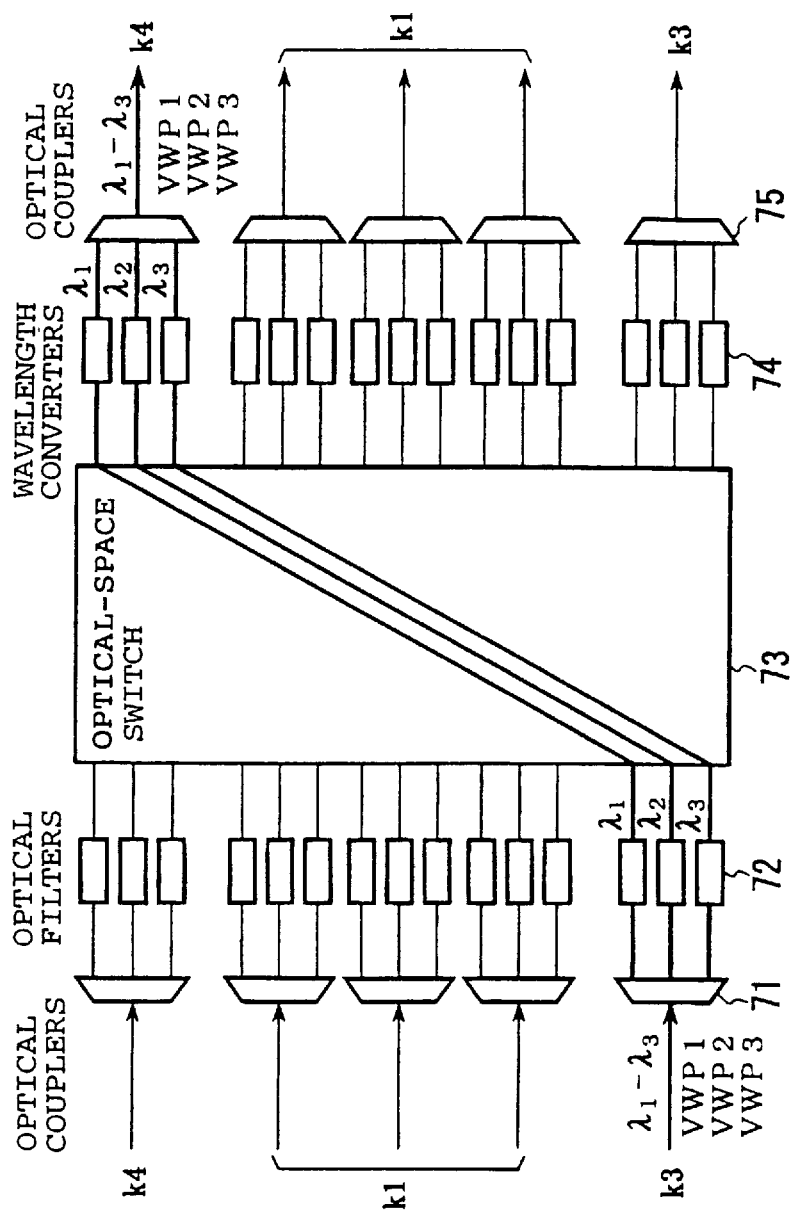
FIG. 20 is an illustration of path rerouting with a routing component in a VWP network.

FIG. 20 is an illustration of the path rerouting in the routing component 51 for a VWP network. Parts that are the same as those in FIG. 15 are indicated by the same symbols. As described above, when link failure occurs in the working optical transmission line k1, the optical-space switch 73 is switched and controlled so that, as shown in the figure, a path is formed between the interface link k3 and the connection link k4. In this case, the wavelength converters 74 do not have to convert the wavelengths $\lambda 1$ through $\lambda 3$. However, when optical signals of the same wavelength are in a multiplexed state on the connection link k4 side, the wavelength converters 74 convert wavelengths so that the wavelengths are different.

Figure 21:
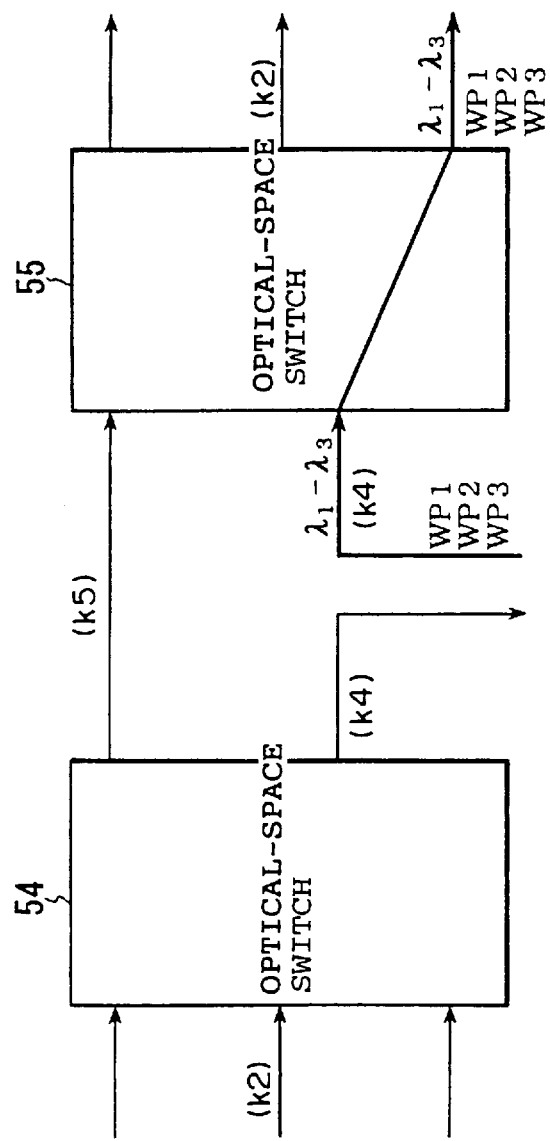
FIG. 21 is an illustration of path rerouting with a Type A bypass component.

FIG. 21 is an illustration of path rerouting in the Type A bypass component 52. This bypass component 52 is composed of first and second optical-space switches 54 and 55. FIG. 21 illustrates a case in which optical signals WP1 through WP3 with wavelengths $\lambda 1$ through $\lambda 3$ are transmitted from the routing component 51 shown in FIG. 19 through the connection links k4 to the optical-space switch 55, and are transmitted to the reserve optical transmission lines k2 in a wavelength multiplexed optical signal state. Accordingly, as shown in FIG. 13(b), when link failure occurs between the optical cross-connect devices I and IV, wavelength multiplexed optical signals with wavelengths $\lambda 1$ through $\lambda 3$ are transmitted through the bypass component 52 to the reserve optical transmission lines k2.

Figure 22:
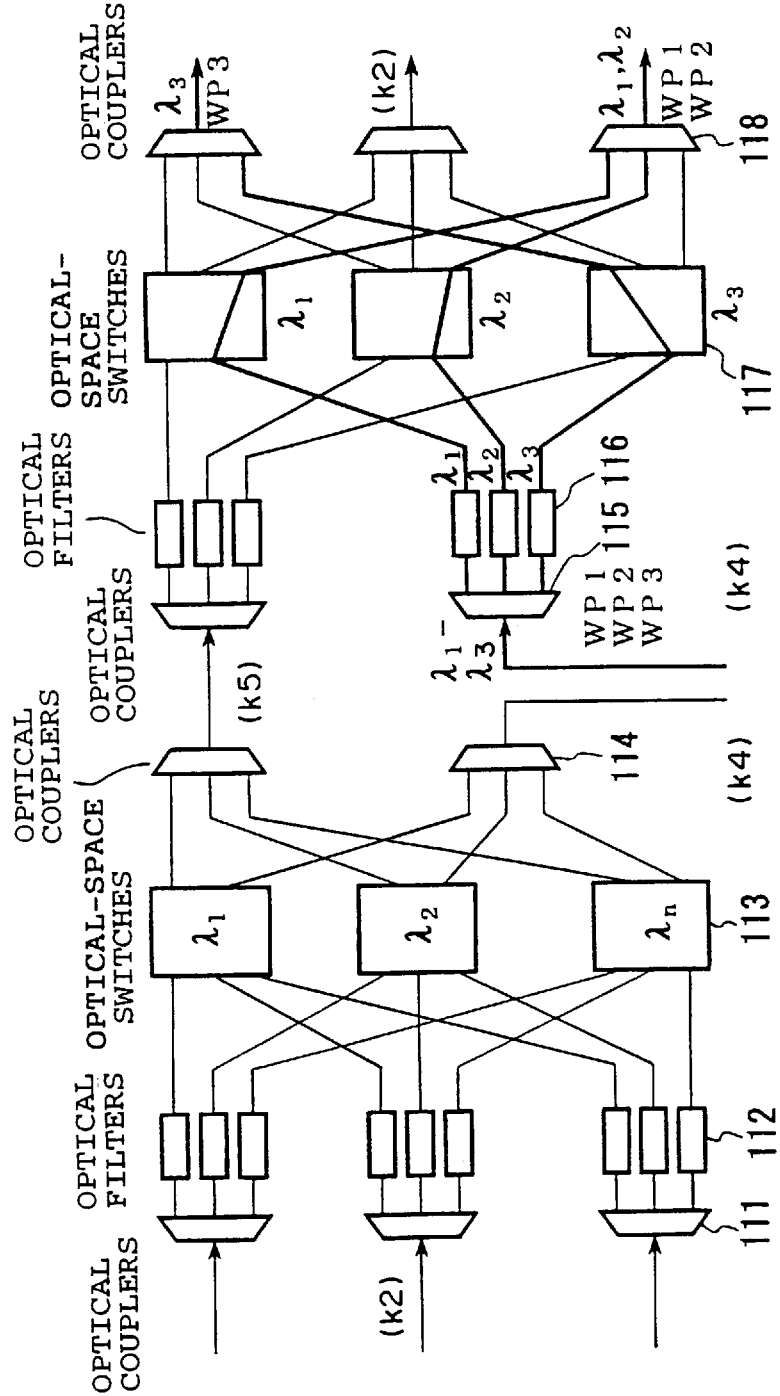
FIG. 22 is an illustration of path rerouting with a Type B bypass component.

FIG. 22 is an illustration of the path rerouting in a Type B bypass component 52. 111 indicates optical couplers, 112 indicates optical filters, 113 indicates first optical-space switches, 114 and 115 indicate optical couplers, 116 indicates optical filters, 117 indicates second optical-space switches, and 118 indicates optical couplers. This structure corresponds to that of the bypass component 52 shown in FIG. 17. In this Type B bypass component, optical signals WP1 through WP3 with wavelengths $\lambda 1$ through $\lambda 3$ are transmitted from the routing component 51 through the connection links k4 and are split by the optical couplers 115, in the same manner as the case depicted in FIG. 21. They are then separated according to wavelength by the optical filters 116. Output paths are selected by the optical-space switches 117. For example, optical signals WP1 and WP2 with wavelengths $\lambda 1$ and $\lambda 2$ are combined by the optical couplers 118 and are transmitted to the same reserve optical transmission lines k2. Optical signal WP3 with a wavelength $\lambda 3$ is transmitted to other reserve optical transmission lines k2. There routes are shown by the thick line.

Figure 23:
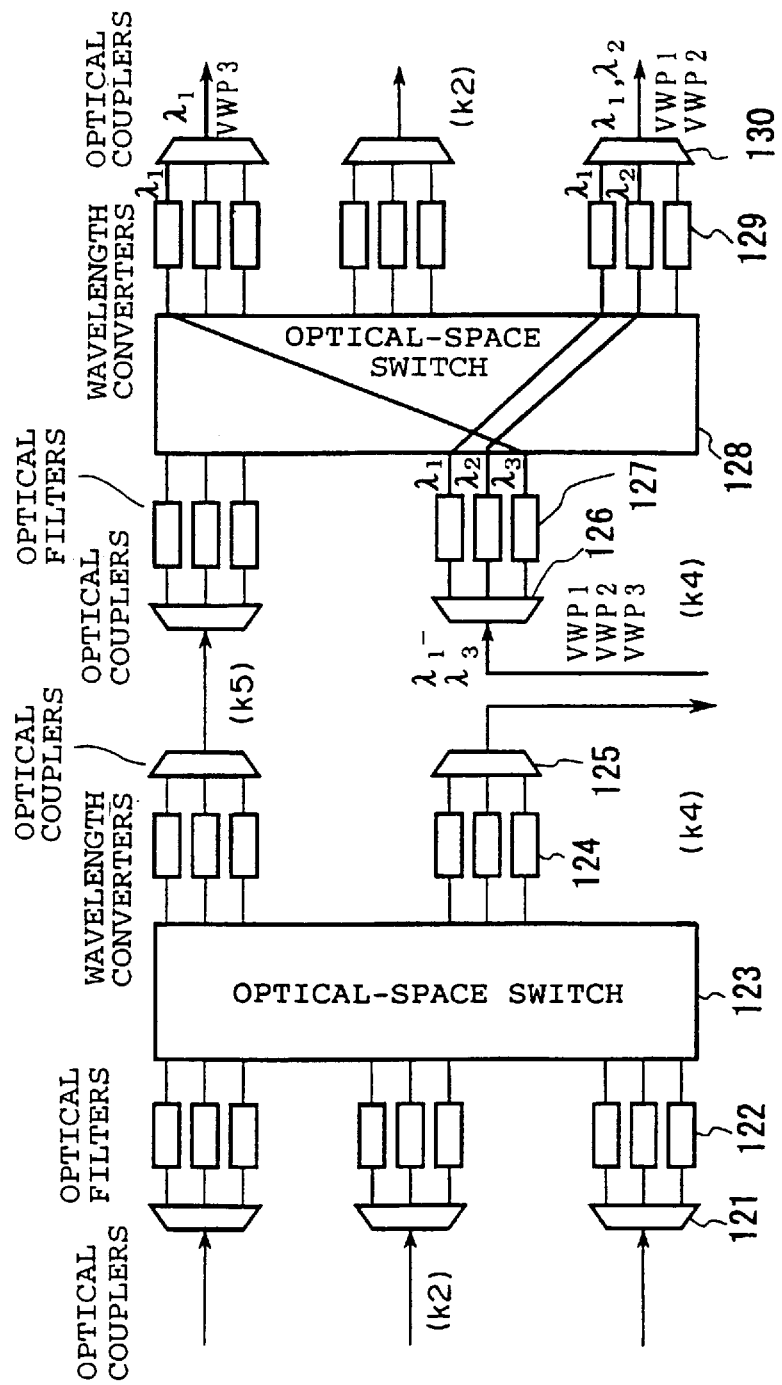
FIG. 23 is an illustration of path rerouting with a Type C bypass component.
Figure 26:
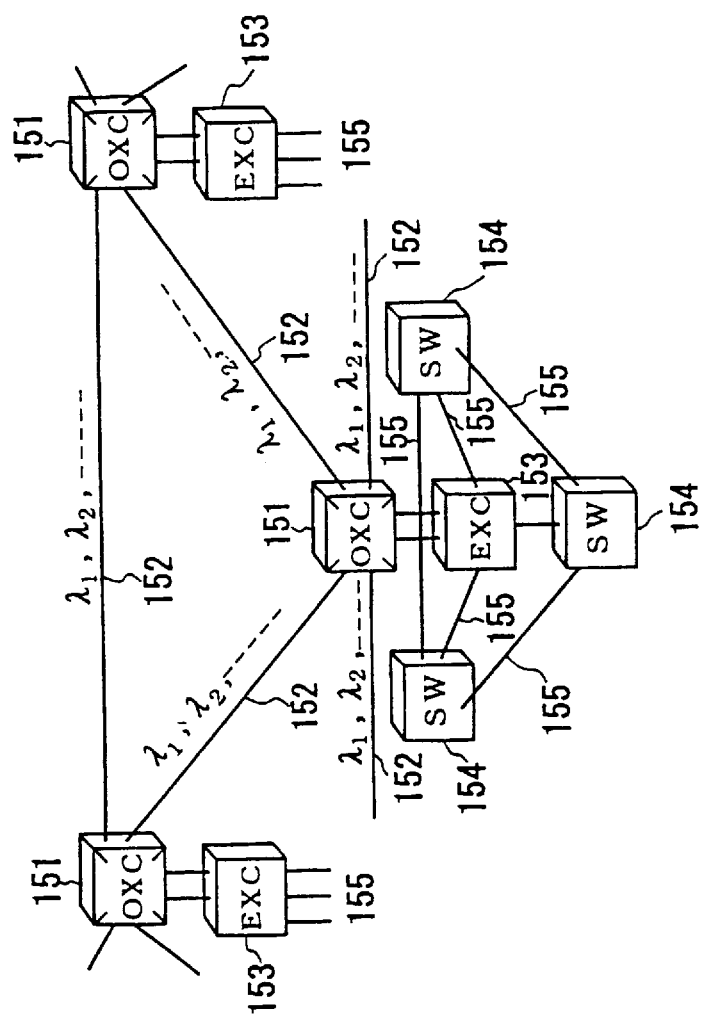
FIG. 26 is an illustration of an optical network.
Figure 27:
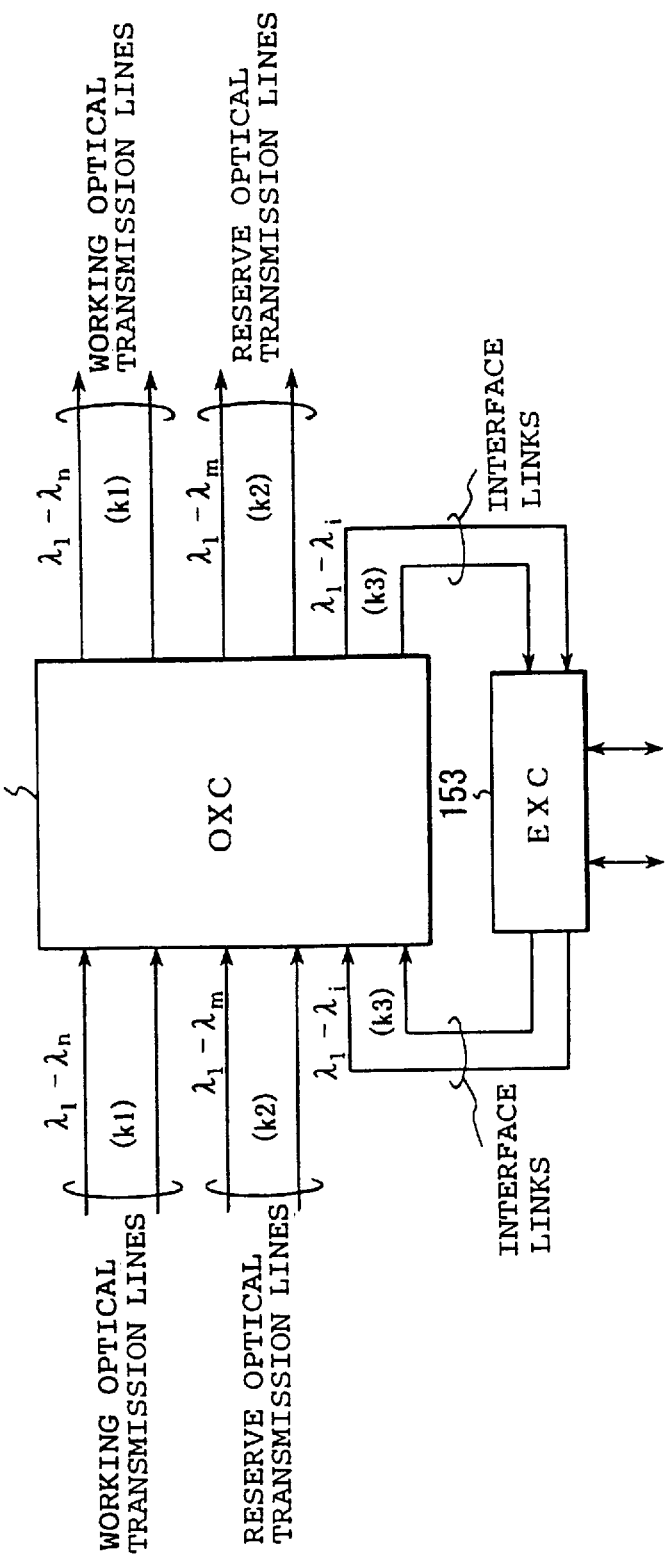
FIG. 27 is an illustration of the relationship between a conventional optical cross-connect device and an electrical cross-connect device.
Figure 28:
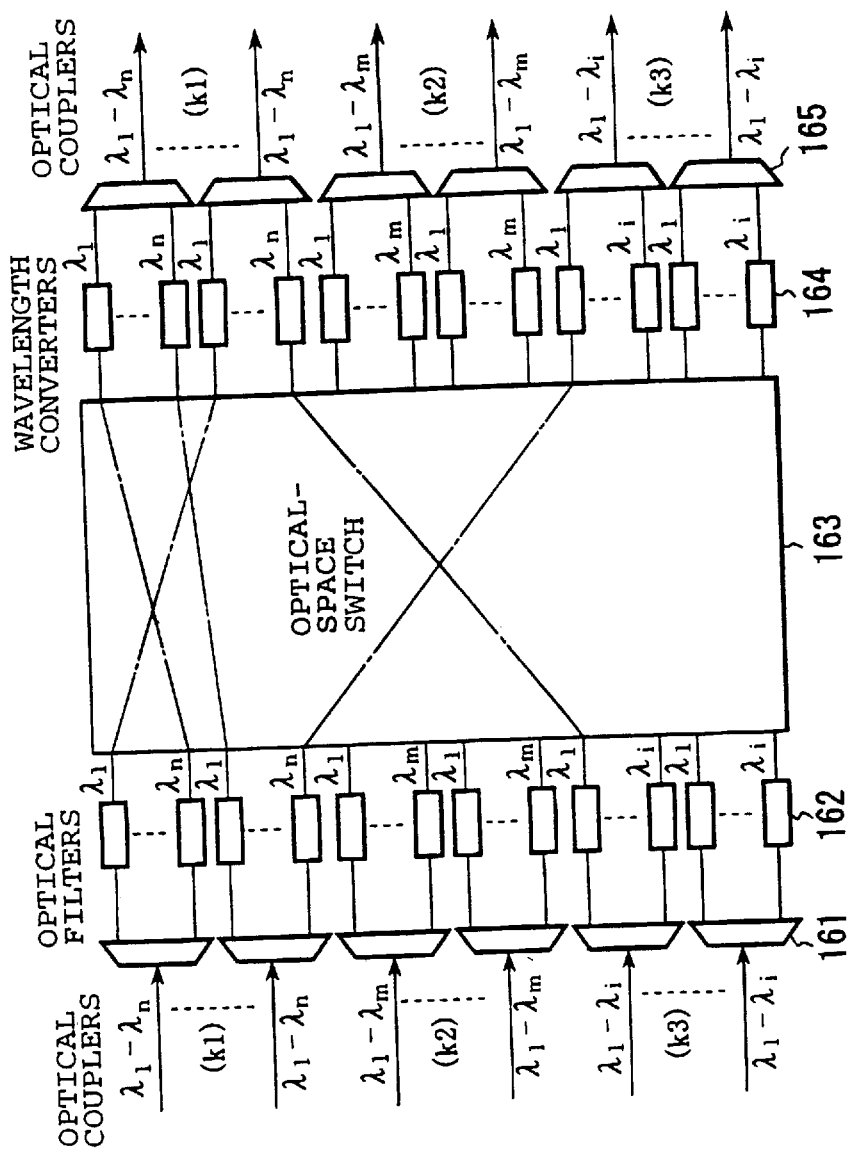
FIG. 28 is an illustration of a conventional optical cross-connect device.

FIG. 23 is an illustration of the path rerouting in a Type C bypass component 52. 121 indicates optical couplers, 122 indicates optical filters, 123 indicates a first optical-space switch, 124 indicates wavelength converters, 125 and 126 indicate optical couplers, 127 indicates optical filters, 128 indicates a second optical-space switch, 129 indicates a wavelength converter, and 130 indicates optical couplers. This structure corresponds to that of the bypass component shown in FIG. 18. In this Type C bypass component, in the same manner as shown in FIG. 21, optical signals WP1 through WP3 with wavelengths $\lambda 1$ through $\lambda 3$ are transmitted from the routing component through the connection links k4 and are split by the optical couplers 126. They are then separated according to wavelength by the optical filters 127. Output ports are then selected by the optical-space switch 128. For example, optical signals WP1 through WP3 with wavelengths λ1 through λ3 are transmitted from the routing component 51 through the connection links k4 and are split by the optical couplers 126, in the same manner as the case depicted in FIG. 21. They are then separated according to wavelength by the optical filters 116. Output ports are selected by the optical-space switches 128. For example, optical signals WP1 and WP2 with wavelengths λ1 and λ2 are combined by the optical couplers 130 and are transmitted to the same reserve optical transmission lines k2. Optical signal WP3 with a wavelength λ3 is transmitted to other reserve optical transmission lines k2. There are routes are shown by the thick line. The wavelength converters 129 convert wavelengths so that the wavelengths are different when optical signals ending up with the same wavelength are transmitted to the reserve optical transmission lines k2.

The path rerouting method shown in Type C of FIG. 13 thus allows link failure in the working optical transmission lines k1 to be resolved as indicated below. That is, from the optical cross-connect device I to the optical cross-connect device II side, wavelength λ3 is converted to wavelength λ1, and the signals are transmitted to the reserve transmission lines k2. Wavelengths λ1 and λ2 are transmitted without wavelength conversion to the optical cross-connect device III side. In optical cross-connect device III, wavelength λ2 is converted to wavelength λ1 and is transmitted to the optical cross-connect device V side. Wavelength λ1 is transmitted without wavelength conversion to the optical cross-connect device VII side.

FIGS. 24 and 25 are comparisons of the structure of the second preferred embodiment. In the figures, a conventional structure for WP and VWP networks is compared with the structure of the present invention, comprising the routing component and Type A, B, and C bypass components for WP and VWP networks. In A, the comparisons are indicated in terms of equations using the number of optical filters, wavelength converters, and 2×2 optical switches based on wavelength n, number k1 of working optical transmission lines, number k2 of reserve optical transmission lines, number k3 of interface links, number k4 of connection links, and the number k5 of bypass links. From B to E show the results of comparisons made under conditions in which the equation constants were altered. For example, when n=4, k1=4, k2=4, k3=2, k4=1, and k5=1, Type B for WP networks in the present invention and conventional WP networks are compared, as shown in B. That is, 40 optical filters are needed in a conventional technique, whereas 28 in routing component and 24 in bypass component were used in the present invention, for a total of 52, which was 12 more. However, 400 optical switches were needed in the conventional technique, whereas a total of 260 in routing component and bypass component were used in the present invention, 65% lower than the conventional technique.

Type C for VWP networks in the present invention and a conventional VWP network were then compared. That is, the conventional technique required 40 optical filters, 40 wavelength converters, and 1600 optical switches. The total of routing components and bypass components in the present invention included 52 optical filters, 52 wavelength converters, and 1040 optical switches. There were accordingly 12 more optical filters and 12 more wavelength converters than in the conventional technique, but 560 less optical switches. Since these expensive optical switches were reduced to 65%, this option was more economical.

C shows a case where n=4, k1=8, k2=8, k3=4, k4=2, and k5=2. When there are 8 working optical transmission lines, twice as many as in B, the number of connection links, which was now 2, also doubled. Type B for WP networks in the present invention was then compared with a conventional WP network. That is, the conventional example required 80 optical filters and 1600 optical switches, whereas the total of routing components and bypass components in the present invention involved 104 optical filters and 1040 optical switches. The present invention thus had 24 more optical filters than the conventional example, but 560 fewer optical switches.

Type C for VWP networks in the present invention was compared with a conventional VWP network. That is, the conventional technique required 80 optical filters, 80 wavelength converters, and 6400 optical switches, whereas the total of routing components and bypass components in the present invention involved 104 optical filters, 104 wavelength converters, and 4160 optical switches. There were thus 24 more optical filters and 24 more wavelength converters than in the conventional technique, but 2240 fewer optical switches.

D shows a case where n=8, k1=8, k2=8, k3=4, k4=2, and k5=2. Type B for WP networks in the present invention was compared with a conventional WP network. That is, the conventional technique required 160 optical filters and 3200 optical switches, whereas the total of routing components and bypass components in the present invention involved 208 optical filters and 2080 optical switches. There were thus 48 more optical filters than in the conventional technique, but 1120 fewer optical switches.

Type C for VWP networks in the present invention was compared with a conventional VWP network. That is, the conventional technique required 160 optical filters, 160 wavelength converters, and 25600 optical switches, whereas the total of routing components and bypass components in the present invention involved 208 optical filters, 208 wavelength converters, and 16640 optical switches. There were thus 48 more optical filters and 48 more wavelength converters than in the conventional technique, but 8960 fewer optical switches.

E shows a case where n=8, k1=16, k2=16, k3=8, k4=4, and k5=4. Type B for WP networks in the present invention was compared with a conventional WP network. That is, the conventional technique required 320 optical filters and 12800 optical switches, whereas the total of routing components and bypass components in the present invention involved 416 optical filters and 8320 optical switches. There were thus 96 more optical filters than in the conventional technique, but 4480 fewer optical switches.

Type C for VWP networks in the present invention was compared with a conventional VWP network. That is, the conventional technique required 320 optical filters, 320 wavelength converters, and 102400 optical switches, whereas the total of routing components and bypass components in the present invention involved 416 optical filters, 416 wavelength converters, and 66560 optical switches. There were thus 96 more optical filters and 96 more wavelength converters than in the conventional technique, but 35840 fewer optical switches.

As described above, the number of optical filters and wavelength converters is greater than in the conventional technology, but the number of expensive optical switches can be reduced to 65%, allowing the cost of optical cross-connect devices to be reduced, and also allowing them to be miniaturized.

The present invention is not limited only to the preferred embodiments described above. Various additional modifications can be made. For example, dielectric film filters, grating type filters, Fabry-Perot filters, acousto-optic filters, semiconductor filters, and the like can be used as the optical filter for separation according to wavelengths $\lambda 1$ through $\lambda n$.

Examples of wavelength converters which can be used include: a) semiconductor structures laser based which can tune wavelengths without optical to electrical signal by controlling the incoming electrical current; b) structures using a optical to electrical converter and an electrical to optical converter based on direct modulation of a tunable wavelength semiconductor laser which can tune wavelengths by controlling the current; and c) structures based on an external modulation method using an optical to electrical converter, a wavelength variable semiconductor laser which can tune wavelengths by controlling the current, and a $LiNbO_3$ optical modulator.

Examples of optical switches which can be used include structures comprising electrodes and waveguides on a dielectric substrate such as $LiNbO_3$, structures based on semiconductor elements such as GaAs and InP and silica-based waveguide structure.

As this invention may be embodied in several forms without departing from the spirit of essential characteristics thereof, the present embodiment is therefore-illustrative and not restrictive, since the scope of the invention is defined by the appended claims rather than by the description pending them, and all changes that fall within meets and bounds of the claims, or equivalence of such meets and bounds are therefore intended by the claims.

What is claimed is:

1. An optical cross-connect device connected to reserve optical transmission lines and working optical transmission lines, and used to switch wavelength multiplexed optical signals, comprising:

a bypass component connected to the reserve optical transmission lines and includes at least an optical-space switch;

a routing component connected to the working optical transmission lines and includes at least an optical-space switch; and wherein said routing component is connected, on the input port, with working optical transmission lines and the connection links to the bypass component, and includes:

first optical couplers for separating the wavelength multiplexed optical signals;

optical filters for filtering according to wavelength the wavelength multiplexed optical signals split by the first optical couplers;

an optical-space switch for switching each optical signal from the first optical filters to the desired output port;

wavelength converters for converting the wavelengths of output signals from the optical-space switch; and second optical couplers for combining the output optical signals from the wavelength converters to produce the wavelength multiplexed optical signals; and said bypass component includes:

a first optical-space switch connected to the reserve optical transmission lines on the input port;

a second optical-space switch connected to the reserve optical transmission lines on the output port;

bypass links connected between the output port of the first optical-space switch and the input port of the second optical-space switch; and connection links, connected between the output port of the first optical-space switch and the input port of the routing component, and between the input port of the second optical-space switch and the output port of the routing component.

2. An optical cross-connect device, connected to a switching device via interface links, said optical cross-connect device connected to reserve optical transmission lines and working optical transmission lines, and used to switch optical signals, comprising:

a bypass component including an optical-space switch having a plurality of input parts and output parts, the reserve optical transmission lines connected to the input parts and output parts;

a routing component including an optical-space switch having a plurality of input parts and output parts, the working optical transmission lines and the interface links connected to the input parts and output parts of the bypass component; and connection links connected between the input parts of the optical-space switch in the bypass component and the output parts of the optical-space switch in the routing component, the connection links further connected between the output parts of the optical-space switch in the bypass component and the input parts of the optical-space switch in the routing component.

3. An optical cross-connect device according to claim 2, wherein said routing component is used to route the wavelength multiplexed optical signals.

4. An optical cross-connect device connected to reserve optical transmission lines and working optical transmission lines, and used to switch wavelength multiplexed optical signals, comprising:

a bypass component connected to the reserve optical transmission lines and includes at least an optical-space switch;

a routing component connected to the working optical transmission lines and includes at least an optical-space switch; and wherein said routing component includes:

optical couplers for splitting the wavelength multiplexed optical signals;

optical filters for separating the wavelength multiplexed optical signals split by the first optical couplers;

an optical-space switch for switching each optical signal from the optical filters to the desired output port;

wavelength converters for converting the wavelength of output optical signals from the optical-space switch; and optical couplers for combining the output optical signals from the wavelength converters to produce the wavelength multiplexed optical signals.

5. An optical cross-connect device connected to reserve optical transmission lines and working optical transmission lines, and used to switch wavelength multiplexed optical signals, comprising:

a bypass component connected to the reserve optical transmission lines and includes at least an optical-space switch;

a routing component connected to the working optical transmission lines and includes at least an optical-space switch; and wherein said bypass component comprises:

first optical couplers for splitting wavelength multiplexed optical signals;

first optical filters for separating the wavelength multiplexed optical signals split by the first optical couplers;

a first optical-space switch for inputting optical signals separated according to the wavelength by the first optical filters;

second optical couplers for combining the output signals from the first optical-space switch for transmission to the bypass links and connection links;

third optical couplers for splitting the wavelength multiplexed optical signals that have been input through the bypass links and the wavelength multiplexed optical signals that have been input through the connection links;

second optical filters for separating the wavelength multiplexed optical signals split by the third optical couplers;

a second optical-space switch for inputting optical signals filtered out according to the wavelength by the second optical filters; and fourth optical couplers for combining the output signals from the second optical-space switch for transmission to the reserve optical transmission lines.

6. An optical cross-connect device connected to reserve optical transmission lines and working optical transmission lines, and used to switch wavelength multiplexed optical signals, comprising:

a bypass component connected to the reserve optical transmission lines and includes at least an optical-space switch;

a routing component connected to the working optical transmission lines and includes at least an optical-space switch; and wherein said bypass component includes:
first optical couplers for splitting wavelength multiplexed optical signals;
optical filters for separating the wavelength multiplexed optical signals split by the first optical couplers;
an optical-space switch for routing output signals from the optical filters; and
optical couplers for producing the wavelength multiplexed optical signals from the output optical signals from the optical-space switch,
wherein the bypass component is connected between the input and output ports of the reserve optical transmission lines, and the connection links are such that the output port of the bypass component is connected to the input port of the routing component and the output port of the routing component is connected to the input port of the bypass component.

7. An optical cross-connect device connected to reserve optical transmission lines and working optical transmission lines, and used to switch wavelength multiplexed optical signals, comprising:

a bypass component connected to the reserve optical transmission lines and includes at least an optical-space switch;

a routing component connected to the working optical transmission lines and includes at least an optical-space switch; and wherein said bypass component includes:
first optical couplers for splitting wavelength multiplexed optical signals;
optical filters for separating the wavelength multiplexed optical signals split by the first optical couplers;
an optical-space switch for routing output signals from the optical filters;
wavelength converters for converting the wavelength of output signals from the optical-space switch; and
second optical couplers for producing the wavelength multiplexed optical signals by combining the output optical signals from the wavelength converters,
wherein the bypass component is connected between the input and output ports of the reserve optical transmission lines, and the connection links are such that the output port of the bypass component is connected to the input port of the routing component, and the output port of the routing component is connected to the input port of the bypass component.

8. An optical cross-connect device connected to reserve optical transmission lines and working optical transmission lines, and used to switch wavelength multiplexed optical signals, comprising:

a bypass component connected to the reserve optical transmission lines and includes at least an optical-space switch;

a routing component connected to the working optical transmission lines and includes at least an optical-space switch; and wherein said bypass component comprises:
a first optical-space switch connected to the reserve optical transmission lines on the input port;
a second optical-space switch connected to the reserve optical transmission lines on the output port;
bypass links connected between the output port of the first optical-space switch and the input port of the second optical-space switch; and
connection links, which are connected between the output port of the first optical-space switch and the input port of the routing component, and between the input port of the second optical-space switch and the output port of the routing component.

9. An optical cross-connect device according to claim 8, wherein said bypass component comprises:

wavelength converters connected to the output port of the first optical-space switch; and wavelength converters connected to the output port of the second optical-space switch.

* * * * *